United States Patent
Zhang et al.

(10) Patent No.: US 12,507,206 B2
(45) Date of Patent: Dec. 23, 2025

(54) PAGING MULTIPLE DEVICES USING A COMMON PAGING OCCASION

(71) Applicant: QUALCOMM Incorporated, San Diego, CA (US)

(72) Inventors: Juan Zhang, Beijing (CN); Gavin Bernard Horn, La Jolla, CA (US); Ozcan Ozturk, San Diego, CA (US); Punyaslok Purkayastha, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 362 days.

(21) Appl. No.: 18/012,204

(22) PCT Filed: Sep. 3, 2020

(86) PCT No.: PCT/CN2020/113205
§ 371 (c)(1),
(2) Date: Dec. 21, 2022

(87) PCT Pub. No.: WO2022/047693
PCT Pub. Date: Mar. 10, 2022

(65) Prior Publication Data
US 2023/0269702 A1    Aug. 24, 2023

(51) Int. Cl.
*H04W 68/12* (2009.01)
*H04W 60/00* (2009.01)
(Continued)

(52) U.S. Cl.
CPC ......... *H04W 68/12* (2013.01); *H04W 60/005* (2013.01); *H04W 68/02* (2013.01); *H04W 88/06* (2013.01)

(58) Field of Classification Search
None
See application file for complete search history.

(56) References Cited

U.S. PATENT DOCUMENTS

2010/0203906 A1* 8/2010 Fang ............... H04W 68/025
455/458
2011/0244880 A1 10/2011 Chin et al.
(Continued)

FOREIGN PATENT DOCUMENTS

CN        101800975 A    8/2010
CN        103999524 A    8/2014
(Continued)

OTHER PUBLICATIONS

3GPP TR 23.761 V0.4.0: "3rd Generation Partnership Project; Technical Specification Group Services and System Aspects; Study on system enablers for devices having multiple Universal Subscriber Identity Modules (USIM) (Release 17)", No. V0.4.0, Jun. 24, 2020, 79 Pages, 6.14 Solution #14: Paging collision avoidance by changing NAS parameters, p. 59-p. 62, 6.17 Solution #17: Resolving paging conflict using MUSIM Assistance Information; p. 67-p. 71.

(Continued)

*Primary Examiner* — Frantz Bataille
(74) *Attorney, Agent, or Firm* — Loza & Loza, LLP

(57) ABSTRACT

Aspects of the disclosure relate to paging multiple subscription devices during a common paging occasion. In an aspect, a core network device may perform a first network registration with a first wireless device using a first subscription, wherein performing the first network registration includes associating a paging reference identifier with the first subscription. The core network device perform a second network registration with a second wireless device using a second subscription, wherein performing the second network registration includes associating the paging reference identifier further with the second subscription. The core network device may further request a base station to page the (Continued)

first wireless device and the second wireless device during a paging occasion based on the paging reference identifier.

35 Claims, 13 Drawing Sheets

(51) Int. Cl.
*H04W 68/02* (2009.01)
*H04W 88/06* (2009.01)

(56) References Cited

U.S. PATENT DOCUMENTS

| | | |
|---|---|---|
| 2013/0244660 A1 | 9/2013 | Kumar et al. |
| 2014/0248922 A1 | 9/2014 | Josso et al. |
| 2015/0050952 A1 | 2/2015 | Ponukumati |
| 2016/0262130 A1* | 9/2016 | Johansson ............ H04W 76/19 |

FOREIGN PATENT DOCUMENTS

| | | |
|---|---|---|
| CN | 110167141 A | 8/2019 |
| WO | 2019101536 A1 | 5/2019 |
| WO | 2020137238 A1 | 7/2020 |

OTHER PUBLICATIONS

Sony: "Solution KI#2: UE suggested UE_ID for paging", SA WG2 Meeting #136, S2-1911143, 3rd Generation Partnership Project (3GPP), Mobile Competence Centre, 650, Route Des Lucioles, F-06921 Sophia-Antipolis Cedex, France, vol. SA WG2, No. Reno, US, Nov. 18, 2019-Nov. 22, 2019, Nov. 8, 2019, 5 Pages, XP051821245.
Supplementary European Search Report—EP20951940—Search Authority—Munich—Apr. 26, 2024.
International Search Report and Written Opinion—PCT/CN2020/113205—ISA/EPO—May 26, 2021.

* cited by examiner

PAGING MULTIPLE DEVICES USING A COMMON PAGING OCCASION

CROSS-REFERENCE TO RELATED APPLICATIONS(S)

This application for patent is a U.S. National Stage entry of PCT Patent Application No. PCT/CN2020/113205 filed 3 Sep. 2020, and assigned to the assignee thereof and hereby expressly incorporated by reference herein as if fully set forth below in its entirety and for all applicable purposes.

TECHNICAL FIELD

The technology discussed below relates generally to wireless communication systems, and more particularly, to paging multiple subscriber devices during a common paging occasion.

INTRODUCTION

A user equipment (UE) often uses a subscription to connect to a service network, which provides one or more services such as a voice call service or a data service. For example, a subscription used by the UE may be associated with a subscription module or device such as a subscriber identity module (SIM) that the UE accesses to use the subscription. With development of the subscription based services, a UE that is capable of using two or more subscriptions are increasingly used. In one example, a UE may implement a dual SIM that allows the UE to connect to a service network using two different subscriptions respectively provided by two SIMs. After completing a network registration procedure with a core network, the core network may page one or more SIMs. Various improvements for paging one or more devices utilizing multiple subscriptions are being studied.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to paging multiple devices during a common paging occasion. Paging multiple devices using respective multiple paging occasions may not be desirable because the multiple devices may need to wake up multiple times for the multiple paging occasions. Therefore, the disclosure provides approaches to enable paging multiple devices during a common paging occasion.

In one example, a method of wireless communication by a core network device is disclosed. The method includes performing a first network registration with a first wireless device using a first subscription, wherein performing the first network registration includes associating a paging reference identifier with the first subscription, performing a second network registration with a second wireless device using a second subscription, wherein performing the second network registration includes associating the paging reference identifier further with the second subscription, and requesting a base station to page the first wireless device and the second wireless device during a paging occasion based on the paging reference identifier.

In an aspect, according to the first approach, performing the first network registration may include receiving a first registration request for the first network registration from the first wireless device using the first subscription, the first registration request including a paging reference identifier request, allocating the paging reference identifier to associate the paging reference identifier with the first subscription in response to the paging reference identifier request, and transmitting a first registration response including the paging reference identifier to the first wireless device in response to the first registration request. In an aspect, the first registration response may further include a first global unique temporary identifier (GUTI) associated with the first wireless device. In an aspect, the first registration request may be received at a first access and mobility management function (AMF) of the core network device, and the first registration response may be transmitted from the first AMF.

In an aspect, according to the second approach, performing the first network registration may include receiving a first registration request for the first network registration from the first wireless device using the first subscription, the first registration request including the paging reference identifier associated with the first subscription, and transmitting a first registration response including the paging reference identifier to the first wireless device in response to the first registration request. In an aspect, the first registration request may be received at a first AMF of the core network device, and the first registration response may be transmitted from the first AMF.

In an aspect, performing the second network registration may include receiving a second registration request for the second network registration from the second wireless device using the second subscription, the second registration request including the paging reference identifier, associating the paging reference identifier further with the second subscription; and transmitting a second registration response to the second wireless device in response to the second registration request. In an aspect, the second registration request may be received at a second AMF of the core network device, and the second registration response may be transmitted from the second AMF. In an aspect, the second registration response may include a second GUTI associated with the second wireless device.

In an aspect, requesting the base station to page the first and second wireless devices may include requesting the base station to transmit one or more paging messages to the first wireless device and the second wireless device during a paging occasion based on the paging reference identifier, the one or more paging messages including a first device identifier associated with the first wireless device and a second device identifier associated with the second wireless device. In an aspect, the one or more paging messages are transmitted in a paging frame based on the paging reference identifier. In an aspect, the first device identifier is a first temporary mobile subscriber identity (TMSI) and the second device identifier is a second TMSI.

In an aspect, requesting the base station to transmit the one or more paging messages may include transmitting, to the base station, a first paging request including the paging reference identifier and the first device identifier associated with the first wireless device, and transmitting, to the base station, a second paging request including the paging reference identifier and the second device identifier associated with the second wireless device. In this aspect, the first paging request and the second paging request cause the base station to transmit the one or more paging messages to the first wireless device and the second wireless device.

In an aspect, the method may include updating the paging reference identifier to associate the updated paging reference identifier with the first subscription and the second subscription.

In an aspect, according to the first approach, updating the paging reference identifier may include allocating the updated paging reference identifier to associate the updated paging reference identifier with the first subscription; transmitting the updated paging reference identifier to the first wireless device, receiving a registration update request from the second wireless device, the registration update request including the updated paging reference identifier, and associating the updated paging reference identifier further with the second subscription. In an aspect, the updated paging reference identifier is transmitted to the first wireless device via at least one of a network registration procedure or a device configuration update procedure.

In an aspect, according to the second approach, updating the paging reference identifier may include receiving a first registration update request from the first wireless device, the first registration update including the updated paging reference identifier associated with the first subscription, receiving a second registration update request from the second wireless device, the second registration update including the updated paging reference identifier, and associating the updated paging reference identifier further with the second subscription.

In an aspect, the paging reference identifier may be allocated independent of a first GUTI associated with the first wireless device. In an aspect, the first wireless device and the second wireless device may be a first subscriber identity module (SIM) and a second SIM implemented within a user equipment (UE), respectively. In an aspect, the first wireless device and the second wireless device may be separately operable.

In another example, a core network device for wireless communication is disclosed. The core network device may include at least one processor, a transceiver communicatively coupled to the at least one processor, and a memory communicatively coupled to the at least one processor. The at least one processor may be configured to: perform a first network registration with a first wireless device using a first subscription, wherein performing the first network registration includes associating a paging reference identifier with the first subscription, perform a second network registration with a second wireless device using a second subscription, wherein performing the second network registration includes associating the paging reference identifier further with the second subscription, and request a base station to page the first wireless device and the second wireless device during a paging occasion based on the paging reference identifier.

In another example, a non-transitory processor-readable storage medium having instructions for a core network device thereon is disclosed. The instructions, when executed by a processing circuit, may cause the processing circuit to: perform a first network registration with a first wireless device using a first subscription, wherein performing the first network registration includes associating a paging reference identifier with the first subscription, perform a second network registration with a second wireless device using a second subscription, wherein performing the second network registration includes associating the paging reference identifier further with the second subscription, and request a base station to page the first wireless device and the second wireless device during a paging occasion based on the paging reference identifier.

In another example, a core network device for wireless communication is disclosed. The core network device may include means for performing a first network registration with a first wireless device using a first subscription, wherein performing the first network registration includes associating a paging reference identifier with the first subscription, means for performing a second network registration with a second wireless device using a second subscription, wherein performing the second network registration includes associating the paging reference identifier further with the second subscription, and means for requesting a base station to page the first wireless device and the second wireless device during a paging occasion based on the paging reference identifier.

In one example, a method of wireless communication by a user equipment (UE) is disclosed. The method includes performing a first network registration with a core network device using a first subscription of the UE, wherein performing the first network registration includes associating a paging reference identifier with the first subscription, performing a second network registration with the core network device using a second subscription of the UE, wherein performing the second network registration includes associating the paging reference identifier further with the second subscription, and receiving, from a base station, one or more page messages associated with the first subscription and the second subscription during a paging occasion based on the paging reference identifier.

In an aspect, according to the first approach, performing the first network registration may include transmitting, to the core network device, a first registration request for the first network registration using the first subscription, the first registration request including a paging reference identifier request, and receiving, from the core network device, a first registration response including the paging reference identifier associated with the first subscription in response to the first registration request. In an aspect, the first registration response may further include a first GUTI associated with the first subscription. In an aspect, the first registration request may be transmitted to a first AMF of the core network device, and the first registration response may be received from the first AMF.

In an aspect, according to the second approach, performing the first network registration may include allocating the paging reference identifier to associate the paging reference identifier with the first subscription, transmitting, to the core network device, a first registration request for the first network registration using the first subscription, the first registration request including the paging reference identifier associated with the first subscription, and receiving, from the core network device, a first registration response in response to the first registration request. In an aspect, the first registration request may be transmitted to a first AMF of the core network device, and the first registration response may be received from the first AMF.

In an aspect, performing the second network registration may include transmitting, to the core network device, a second registration request for the second network registration using the second subscription, the second registration request including the paging reference identifier, and receiving, from the core network device, a second registration response in response to the second registration request. In an aspect, the second registration request may be transmitted to a second AMF of the core network device, and the second registration response may be received from the second AMF. In an aspect, the second registration response may include a second GUTI associated with the second subscription.

In an aspect, the one or more paging messages may include a first device identifier associated with the first subscription and a second device identifier associated with the second subscription. In an aspect, the first device identifier may be a first TMSI and the second device identifier may be a second TMSI.

In an aspect, receiving the one or more page messages may include determining the paging occasion based on the paging reference identifier, and monitoring for the one or more page messages during the paging occasion to receive the one or more page messages during the paging occasion. In an aspect, the one or more paging messages may be received in a paging frame based on the paging reference identifier.

In an aspect, the method may include updating the paging reference identifier to associate the updated paging reference identifier with the first subscription and the second subscription.

In an aspect, according to the first approach, updating the paging reference identifier may include receiving, from the core network device, the updated paging reference identifier associated with the first subscription using the first subscription, and transmitting, to the core network device, a registration update request using the second subscription, the registration update request including the updated paging reference identifier to associate the updated paging reference identifier further with the second subscription. In an aspect, the updated paging reference identifier may be received via at least one of a network registration procedure or a device configuration update procedure.

In an aspect, according to the second approach, updating the paging reference identifier may include allocating the updated paging reference identifier to associate the updated paging reference identifier with the first subscription, transmitting, to the core network device, a first registration update request using the first subscription, the first registration update including the updated paging reference identifier associated with the first subscription, and transmitting, to the core network device, a second registration update request using the second subscription, the second registration update including the updated paging reference identifier to associate the updated paging reference identifier further with the second subscription.

In an aspect, the paging reference identifier is allocated independent of a first GUTI associated with the first subscription. In an aspect, the first subscription and the second subscription are respectively associated with a first SIM and a second SIM implemented within the UE.

In another example, a UE for wireless communication is disclosed. The UE may include at least one processor, a transceiver communicatively coupled to the at least one processor, and a memory communicatively coupled to the at least one processor. The at least one processor may be configured to: perform a first network registration with a core network device using a first subscription of the UE, wherein performing the first network registration includes associating a paging reference identifier with the first subscription, perform a second network registration with the core network device using a second subscription of the UE, wherein performing the second network registration includes associating the paging reference identifier further with the second subscription, and receive, from a base station, one or more page messages associated with the first subscription and the second subscription during a paging occasion based on the paging reference identifier.

In another example, a non-transitory processor-readable storage medium having instructions for a UE thereon is disclosed. The instructions, when executed by a processing circuit, may cause the processing circuit to: perform a first network registration with a core network device using a first subscription of the UE, wherein performing the first network registration includes associating a paging reference identifier with the first subscription, perform a second network registration with the core network device using a second subscription of the UE, wherein performing the second network registration includes associating the paging reference identifier further with the second subscription, and receive, from a base station, one or more page messages associated with the first subscription and the second subscription during a paging occasion based on the paging reference identifier.

In another example, a UE for wireless communication is disclosed. The UE may include means for performing a first network registration with a core network device using a first subscription of the UE, wherein performing the first network registration includes associating a paging reference identifier with the first subscription, means for performing a second network registration with the core network device using a second subscription of the UE, wherein performing the second network registration includes associating the paging reference identifier further with the second subscription, and means for receiving, from a base station, one or more page messages associated with the first subscription and the second subscription during a paging occasion based on the paging reference identifier.

In one example, a method of wireless communication by a base station is disclosed. The method includes receiving, from a core network device, a first paging request including a paging reference identifier and a first device identifier associated with a first wireless device configured to communicate using a first subscription, receiving, from the core network device, a second paging request including the paging reference identifier and a second device identifier associated with a second wireless device configured to communicate using a second subscription, wherein the paging reference identifier is associated with the first and second subscriptions, determining a paging occasion for the first and second subscriptions based on the paging reference identifier, and transmitting one or more paging messages to the first wireless device and the second wireless device during the paging occasion.

In an aspect, the method may include determining a paging frame for the first and second subscriptions based on the paging reference identifier.

In an aspect, the one or more paging messages include the first and second device identifiers. In an aspect, the one or more paging messages may be transmitted to the UE in response to the first paging request and the second paging request. In an aspect, the one or more paging messages may be transmitted in the paging frame.

In an aspect, the first paging request may be received from a first AMF of the core network device, and the second paging request may be received from a second AMF of the core network device. In an aspect, the first device identifier may be a first TMSI and the second device identifier may be a second TMSI. In an aspect, the first wireless device and the second wireless device may be a first SIM and a second SIM implemented within a UE, respectively. In an aspect, the first wireless device and the second wireless device may be separately operable.

In another example, a base station for wireless communication is disclosed. The base station may include at least one processor, a transceiver communicatively coupled to the at least one processor, and a memory communicatively coupled to the at least one processor. The at least one processor may be configured to: receive, from a core network device, a first paging request including a paging reference identifier and a first device identifier associated with a first wireless device configured to communicate using a first subscription, receive, from the core network device, a second paging request including the paging reference identifier and a second device identifier associated with a second wireless device configured to communicate using a second subscription, wherein the paging reference identifier is associated with the first and second subscriptions, determine a paging occasion for the first and second subscriptions based on the paging reference identifier, and transmit one or more paging messages to the first wireless device and the second wireless device during the paging occasion.

In another example, a non-transitory processor-readable storage medium having instructions for a base station thereon is disclosed. The instructions, when executed by a processing circuit, may cause the processing circuit to: receive, from a core network device, a first paging request including a paging reference identifier and a first device identifier associated with a first wireless device configured to communicate using a first subscription, receive, from the core network device, a second paging request including the paging reference identifier and a second device identifier associated with a second wireless device configured to communicate using a second subscription, wherein the paging reference identifier is associated with the first and second subscriptions, determine a paging occasion for the first and second subscriptions based on the paging reference identifier, and transmit one or more paging messages to the first wireless device and the second wireless device during the paging occasion.

In another example, a base station for wireless communication is disclosed. The base station may include means for receiving, from a core network device, a first paging request including a paging reference identifier and a first device identifier associated with a first wireless device configured to communicate using a first subscription, means for receiving, from the core network device, a second paging request including the paging reference identifier and a second device identifier associated with a second wireless device configured to communicate using a second subscription, wherein the paging reference identifier is associated with the first and second subscriptions, means for determining a paging occasion for the first and second subscriptions based on the paging reference identifier, and means for transmitting one or more paging messages to the first wireless device and the second wireless device during the paging occasion.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein.

In similar fashion, while exemplary embodiments may be discussed below as device, system, or method embodiments it should be understood that such exemplary embodiments can be implemented in various devices, systems, and methods.

DETAILED DESCRIPTION

Figure 1:
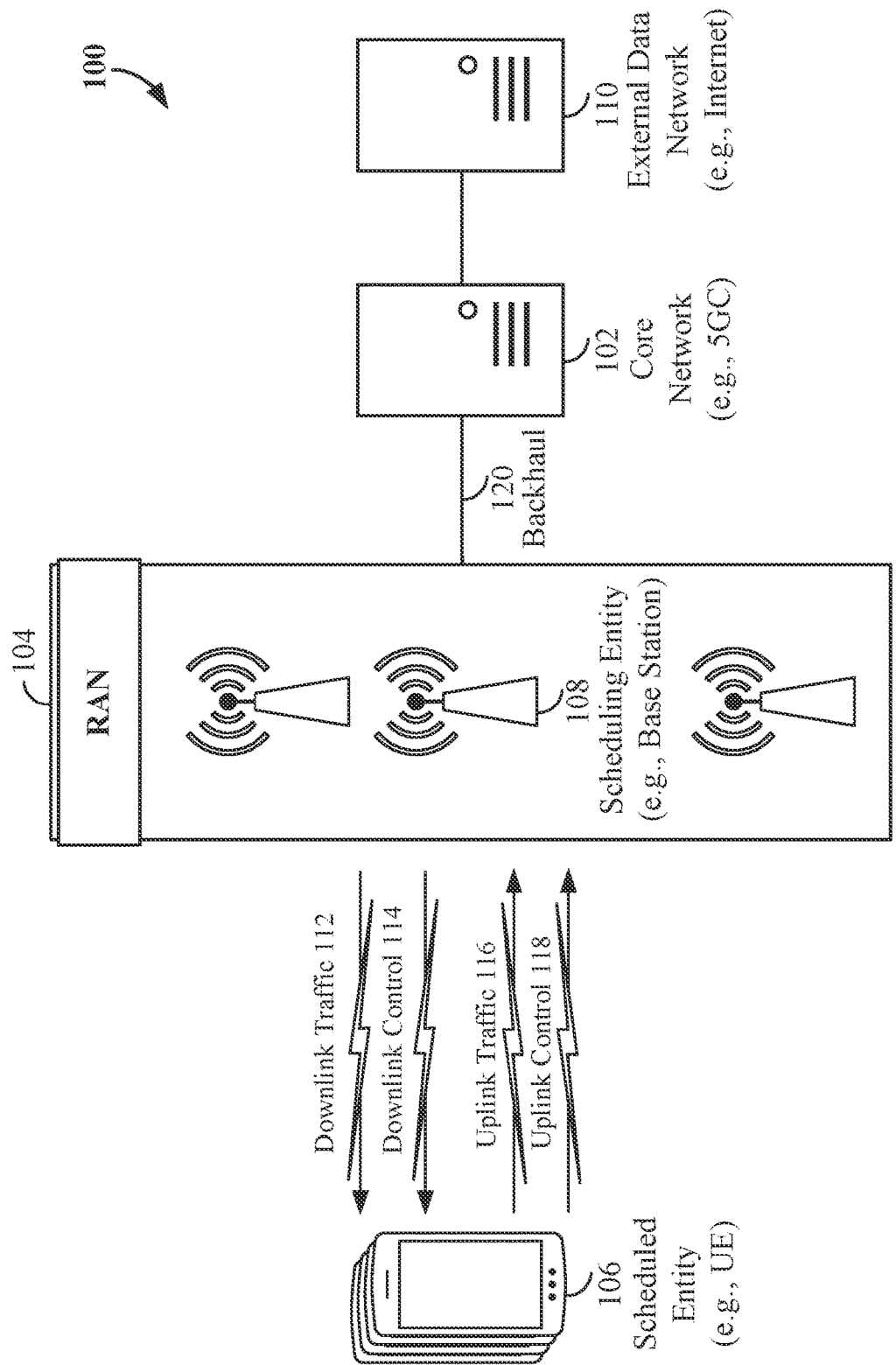
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Multiple devices may be provided to communicate with a base station using multiple subscriptions. For example, a UE may implement multiple subscription identification modules (SIMs) that may be used to communicate using multiple subscriptions, respectively. The multiple devices may be paged by a base station during separate paging occasions. Therefore, if a UE and/or the multiple devices are in a power saving mode, the UE and/or the multiple devices may need to wake up multiple times during the separate paging occasions for the multiple devices. However, waking up multiple times for these separate paging occasions may not be desirable for power saving.

According to an aspect of the disclosure, multiple devices may be paged during a common paging occasion. Thus, for example, the UE and/or the multiple devices may wake up once during the paging occasion to receive one or more paging messages for the multiple devices, instead of waking up multiple times for separate paging occasions for the multiple devices. To achieve this, a paging reference identifier is allocated and is associated with the multiple devices, such that the paging reference identifier may be used to determine the paging occasion.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 50 standards (e.g., 5GC). In other examples, the core network 102 may be configured according to a 4G evolved packet core (EPC), or any other suitable standard or configuration.

Figure 2:
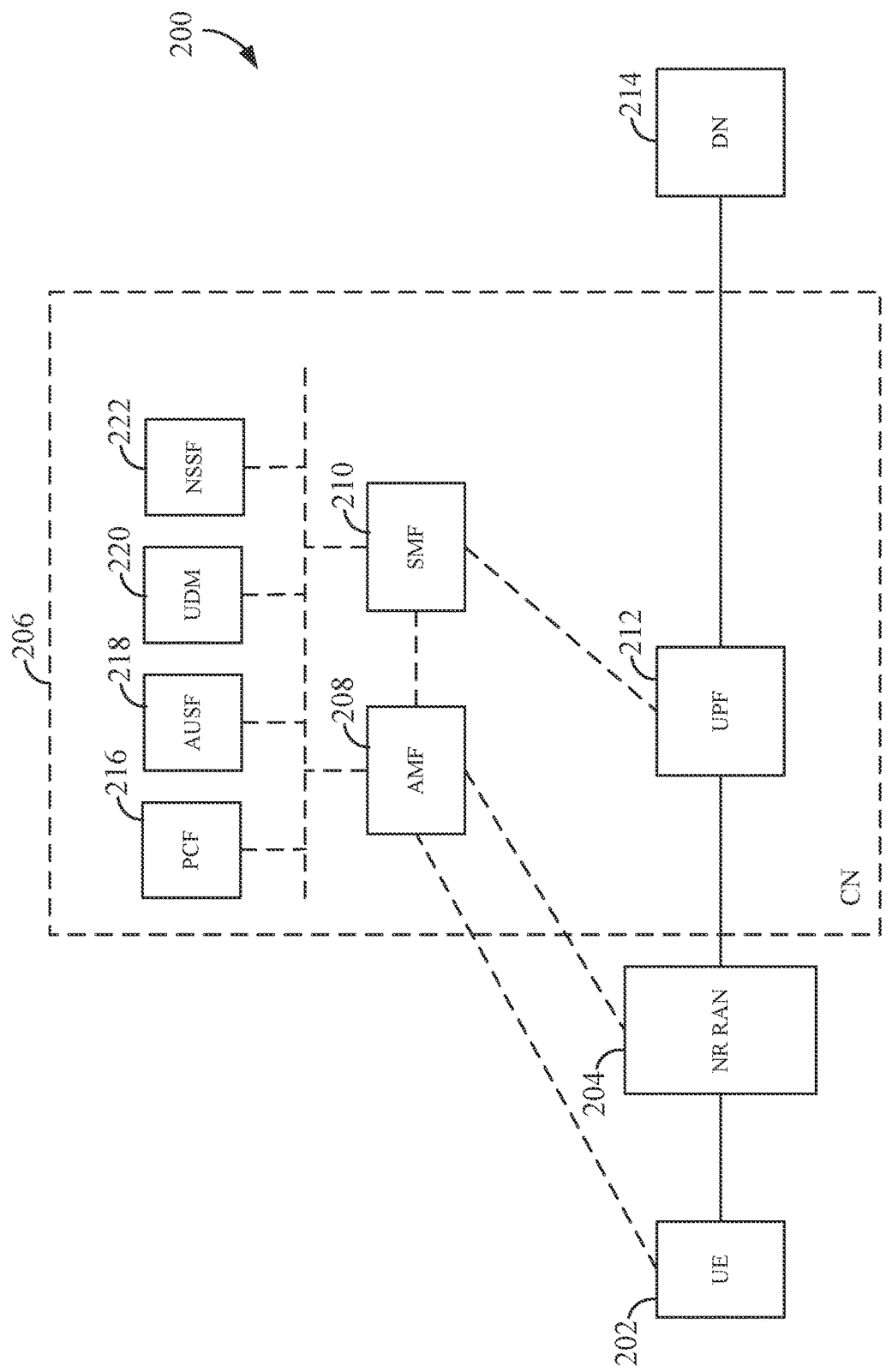
FIG. 2 is a block diagram illustrating an example of a 5G wireless communication system (5GS).

Referring now to FIG. 2, by way of example and without limitation, a block diagram illustrating an example of various components of a 50 wireless communication system (5GS) 200 is provided. In some examples, the 5GS 200 may be the same wireless communication system 100 described above and illustrated in FIG. 1. The 5GS 200 includes a user equipment (UE) 202, a NR RAN 204, and a core network 206. By virtue of the wireless communication system 200, the UE 202 may be enabled to carry out data communication with an external data network 214, such as (but not limited to) the Internet, Ethernet network, an IP multimedia subsystem (IMS) network, or a local area network.

The core network 206 may include, for example, an access and mobility management function (AMF) 208, a session management function (SMF) 210, and a user plane function (UPF) 212. The AMF 208 and SMF 210 employ control plane (e.g., Non Access Stratum (NAS)) signaling to perform various functions related to mobility management and session management for the UE 202. For example, the AMF 208 provides connectivity, mobility management and authentication of the UE 202, while the SMF 210 provides session management of the UE 202 (e.g., processes signaling related to protocol data unit (PDU) sessions between the UE 202 and the external DN 214). The UPF 212 provides user plane connectivity to route 5G (NR) packets to/from the UE 202 via the NR RAN 204.

The core network 206 may further include other functions, such as a policy control function (PCF) 216, authentication server function (AUSF) 218, unified data management (UDM) 220, network slice selection function (NSSF) 222, and other functions (not illustrated, for simplicity). The PCF 216 provides policy information (e.g., rules) for control plane functions, such as network slicing, roaming, and mobility management. In addition, the PCF 216 supports 5G quality of service (QoS) policies, network slice policies, and other types of policies. The AUSF 218 performs authentication of UEs 202. The UDM 220 facilitates generation of authentication and key agreement (AKA) credentials, performs user identification and manages subscription information and UE context. In some examples, the AMF 208 includes a co-located security anchor function (SEAF) that allows for re-authentication of a UE 202 when the UE moves between different NR RANs 204 without having to perform a complete authentication process with the AUSF 218. The NSSF 222 redirects traffic to a network slice. Network slices may be defined, for example, for different classes of subscribers or use cases, such as smart home, Internet of Things (IoT), connected car, smart energy grid, etc. Each use case may receive a unique set of optimized resources and network topology (e.g., a network slice) to meet the connectivity, speed, power, and capacity requirements of the use case.

To establish a connection to the 5G core network 206 via the NR RAN 204, the UE 202 may transmit a registration request and PDU session establishment request to the 5G core network 206 via the NR RAN 204. The AMF 208 and SMF 210 may process the registration request and PDU session establishment request and establish a PDU session between the UE 202 and the external DN 214 via the UPF 212. A PDU session may include one or more sessions (e.g., data sessions or data flows) and may be served by multiple UPFs 212 (only one of which is shown for convenience). Examples of data flows include, but are not limited to, IP flows, Ethernet flows and unstructured data flows.

Figure 3:
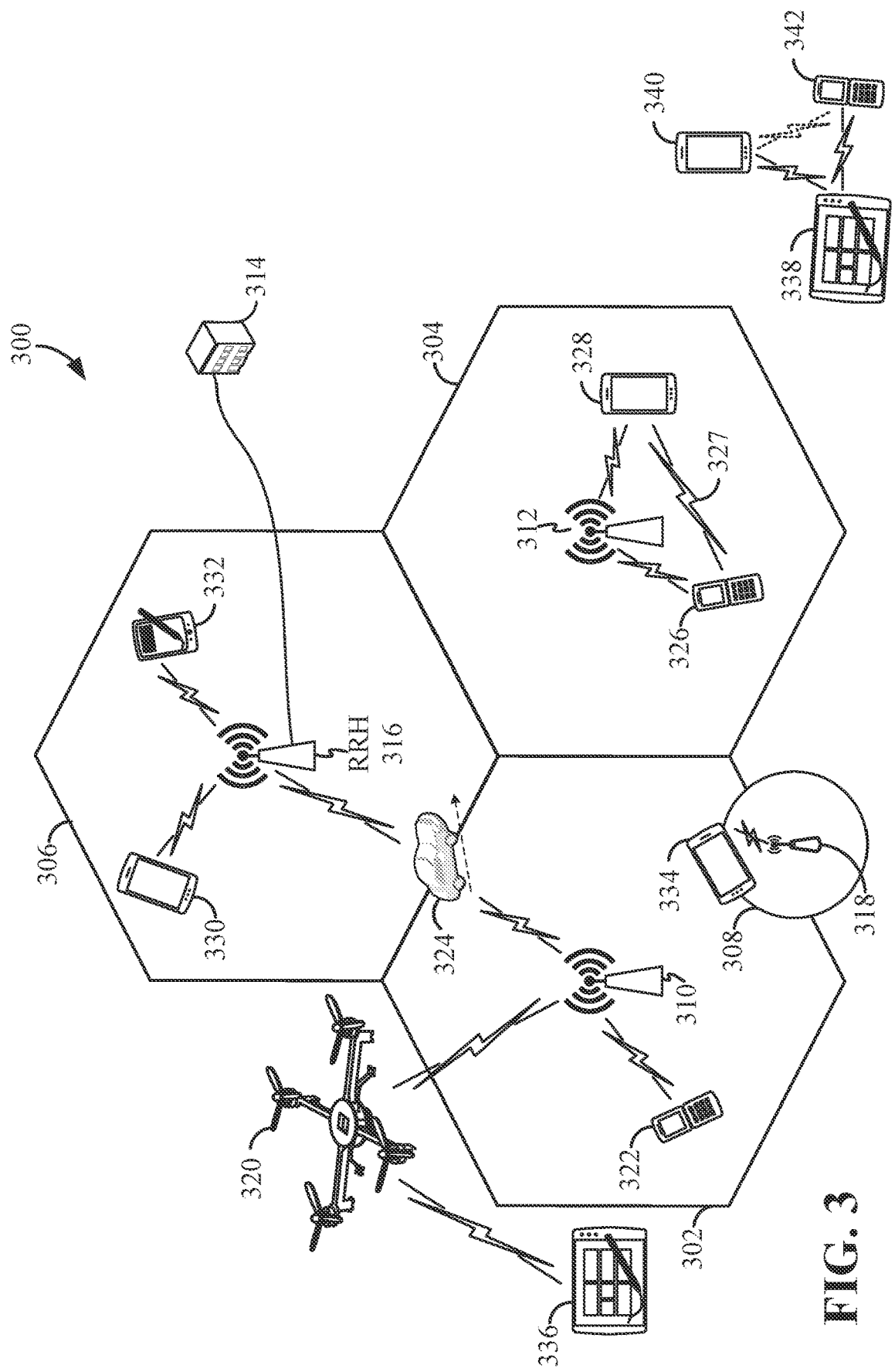
FIG. 3 is a conceptual illustration of an example of a radio access network according to some aspects.

Referring now to FIG. 3, by way of example and without limitation, a schematic illustration of a RAN 300 is provided. In some examples, the RAN 300 may be the same as the RAN 104 described above and illustrated in FIG. 1 and/or the NR RAN 204 described above and illustrated in FIG. 2. The geographic area covered by the RAN 300 may be divided into cellular regions (cells) that can be uniquely identified by a user equipment (UE) based on an identification broadcasted from one access point or base station. FIG. 3 illustrates macrocells 302, 304, and 306, and a small cell 308, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 3, two base stations 310 and 312 are shown in cells 302 and 304; and a third base station 314 is shown controlling a remote radio head (RRH) 316 in cell 306. That is, a base station can have an integrated antenna or can be connected to an antenna or RRH by feeder cables. In the illustrated example, the cells 302, 304, and 126 may be referred to as macrocells, as the base stations 310, 312, and 314 support cells having a large size. Further, a base station 318 is shown in the small cell 308 (e.g., a microcell, picocell, femtocell, home base station, home Node B, home eNode B, etc.) which may overlap with one or more macrocells. In this example, the cell 308 may be referred to as a small cell, as the base station 318 supports a cell having a relatively small size. Cell sizing can be done according to system design as well as component constraints.

It is to be understood that the radio access network 300 may include any number of wireless base stations and cells. Further, a relay node may be deployed to extend the size or coverage area of a given cell. The base stations 310, 312, 314, 318 provide wireless access points to a core network for any number of mobile apparatuses. In some examples, the base stations 310, 312, 314, and/or 318 may be the same as the base station/scheduling entity 108 described above and illustrated in FIG. 1.

FIG. 3 further includes a quadcopter or drone 320, which may be configured to function as a base station. That is, in some examples, a cell may not necessarily be stationary, and the geographic area of the cell may move according to the location of a mobile base station such as the quadcopter 320.

Within the RAN 300, the cells may include UEs that may be in communication with one or more sectors of each cell. Further, each base station 310, 312, 314, 318, and 320 may be configured to provide an access point to a core network 102 (see FIG. 1) for all the UEs in the respective cells. For example, UEs 322 and 324 may be in communication with base station 310; UEs 326 and 328 may be in communication with base station 312; UEs 330 and 332 may be in communication with base station 314 by way of RRH 316; UE 334 may be in communication with base station 318; and UE 336 may be in communication with mobile base station 320. In some examples, the UEs 322, 324, 326, 328, 330, 332, 334, 336, 338, 340, and/or 342 may be the same as the UE/scheduled entity 106 described above and illustrated in FIG. 1.

In some examples, a mobile network node (e.g., quadcopter 320) may be configured to function as a UE. For example, the quadcopter 320 may operate within cell 302 by communicating with base station 310.

In a further aspect of the RAN 300, sidelink signals may be used between UEs without necessarily relying on scheduling or control information from a base station. For example, two or more UEs (e.g., UEs 326 and 328) may communicate with each other using peer to peer (P2P) or sidelink signals 327 without relaying that communication through a base station (e.g., base station 312). In a further example, UE 338 is illustrated communicating with UEs 340 and 342. Here, the UE 338 may function as a scheduling entity or a primary sidelink device, and UEs 340 and 342 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 340 and 342 may optionally communicate directly with one another in addition to communicating with the scheduling entity 338. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 300, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 300 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 324 (illustrated as a vehicle, although any suitable form of UE may be used) may move from the geographic area corresponding to its serving cell 302 to the geographic area corresponding to a neighbor cell 306. When the signal strength or quality from the neighbor cell 306 exceeds that of its serving cell 302 for a given amount of time, the UE 324 may transmit a reporting message to its serving base station 310 indicating this condition. In response, the UE 324 may receive a handover command, and the UE may undergo a handover to the cell 306.

In a network configured for UL-based mobility, UL reference signals from each UE may be utilized by the network to select a serving cell for each UE. In some examples, the base stations 310, 312, and 314/216 may broadcast unified synchronization signals (e.g., unified Primary Synchronization Signals (PSSs), unified Secondary Synchronization Signals (SSSs) and unified Physical Broadcast Channels (PBCH)). The UEs 322, 324, 326, 328, 330, and 332 may receive the unified synchronization signals, derive the carrier frequency and slot timing from the synchronization signals, and in response to deriving timing, transmit an uplink pilot or reference signal. The uplink pilot signal transmitted by a UE (e.g., UE 324) may be concurrently received by two or more cells (e.g., base stations 310 and 314/216) within the radio access network 300. Each of the cells may measure a strength of the pilot signal, and the radio access network (e.g., one or more of the base stations 310 and 314/216 and/or a central node within the core network) may determine a serving cell for the UE 324. As the UE 324 moves through the radio access network 300, the network may continue to monitor the uplink pilot signal transmitted by the UE 324. When the signal strength or quality of the pilot signal measured by a neighboring cell exceeds that of the signal strength or quality measured by the serving cell, the network 300 may handover the UE 324 from the serving cell to the neighboring cell, with or without informing the UE 324.

Although the synchronization signal transmitted by the base stations 310, 312, and 314/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 300 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 4:
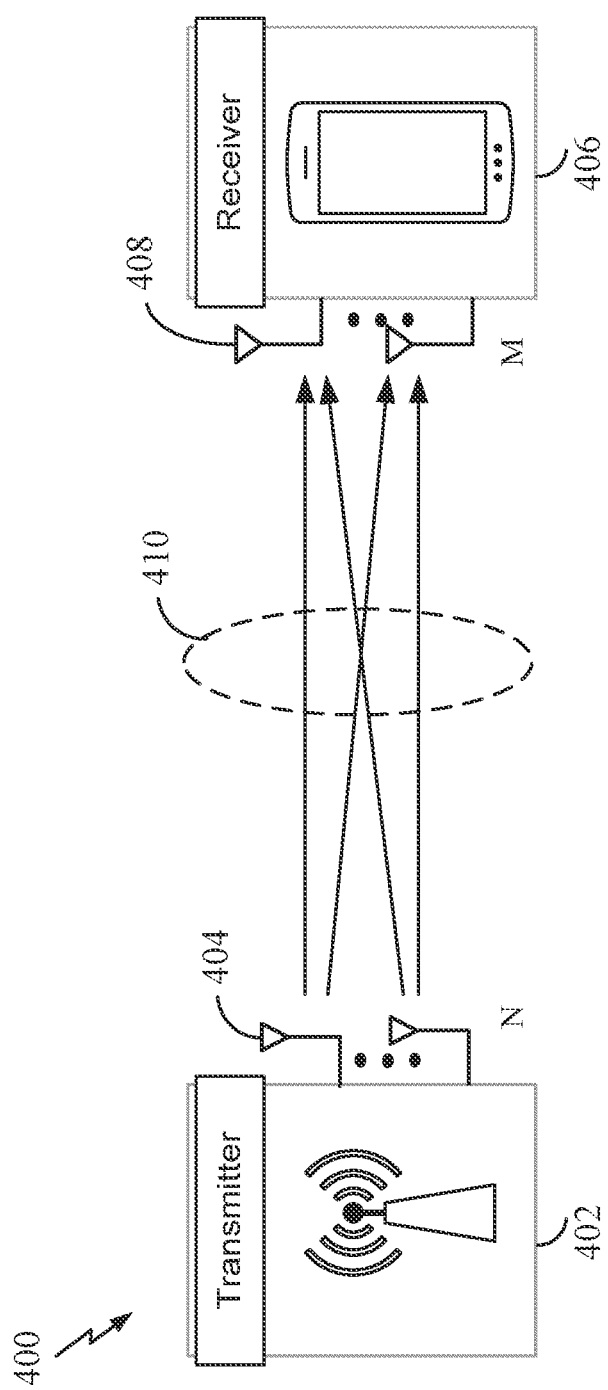
FIG. 4 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

A UE may communicate with a network using a subscription for a service (e.g., data service, voice service) provided by the network. The UE may implement a subscription module such as a subscriber identity module (SIM) to connect to the network. In some cases, the SIM may be a UMTS SIM (SIM). A UE may be configured to communicate using two or more subscriptions. For example, a UE implementing multiple SIMs respectively associated with multiple subscriptions may communicate using the multiple subscriptions via the multiple SIMs. The multiple SIMs may be separate wireless devices capable of operating independently from one another. For example, the multiple SIMs may have independent connections with a RAN (e.g., base station) for layer 1, layer 2, and layer 3 connections. The UE may establish communication links using the multiple subscriptions to perform communication using the multiple subscriptions. The communication links may be established with a common base station. For example, for a UE with two SIMs having a dual SIM, dual active (DSDA) capability, two SIMs may stay connected (or active) simultaneously with a network and thus may be used to perform communication simultaneously. In another example, for a UE with two SIMs having a dual SIM, dual standby (DSDS) capability, while one SIM is used to actively perform communication, the other SIM is placed on standby. In another example, multiple devices each having a SIM and operating independently from one another may also communicate with a network.

The multiple SIMs may be from the same operator or from different operators. In a case where the multiple SIMs belong to the same or equivalent operator, improvements to coordinate links utilized by the multiple SIMs may be made. For example, if a base station can be aware of multiple connections originating from the same UE (e.g., thus sharing the same media access control (MAC) layer and/or the same physical layer), improvements may be made to the base station to optimize the operation of the multiple links.

One area of optimization may be related to paging by a core network for multiple subscriptions. The UE that may be in a power saving mode may wake up to monitor a paging occasion to receive a page message from the core network. Generally, when there are multiple subscriptions/SIMs registered with the core network, the multiple subscriptions/SIMs may use different paging occasions. For example, if a first SIM and a second SIM in the UE are registered with the core network, the UE may wake up for a first paging occasion to monitor for a paging message for the first SIM and may wake up for a second paging occasion different from the first paging occasion to monitor for a paging message for the second SIM. Hence, use of multiple subscriptions/SIMs may require the UE to wake up multiple times to monitor paging for the multiple subscriptions/SIMS respectively. Because the UE may need to wake up more often for more subscriptions/SIMs, more power may be consumed as more subscriptions/SIMs are used and registered with the core network, which may not be desirable for power saving purposes.

The UE may register with the core network via an AMF. When the UE registers with the AMF of the core network, the AMF allocates a 5G global unique temporary identifier (GUTI) for the UE. During a paging procedure, the AMF may send a paging request to the RAN, where the paging request may include a serving temporary mobile subscriber identity (S-TMSI) corresponding to the UE, where the S-TMSI may be the last 10 bit of the 5G GUTI. Subsequently, the RAN may use the S-TMSI to determine a paging occasion and a paging frame. The 5G-S-TMSI may also be included in the paging message transmitted by the RAN to identify the UE. However, if the S-TMSI is used to determine a paging occasion, multiple paging occasions may be determined for multiple subscriptions/SIMs respectively associated with multiple S-TMSIs. Further, a 5G GUTI is a temporary identifier that may constantly change, and thus an S-TMSI or any other identifier that is based on the 5G GUTI may constantly change, which is not desirable. Therefore, using the 5G GUTI or the S-TMSI to determine a paging occasion and/or a paging frame may not be desirable.

According to an aspect of the disclosure, a base station may transmit one or more paging messages for multiple subscriptions during a common paging occasion, instead of utilizing multiple paging occasions for the multiple subscriptions. In an aspect, a paging reference identifier may be allocated and may be associated with the multiple subscriptions, such that the same paging occasion for paging for the multiple subscriptions may be determined based on the paging reference identifier. Because one paging occasion is used to page for the multiple subscriptions, the UE may need to wake up only once to monitor paging for the multiple subscriptions during the paging occasion, instead of waking up multiple times for the multiple subscriptions.

Figure 5:
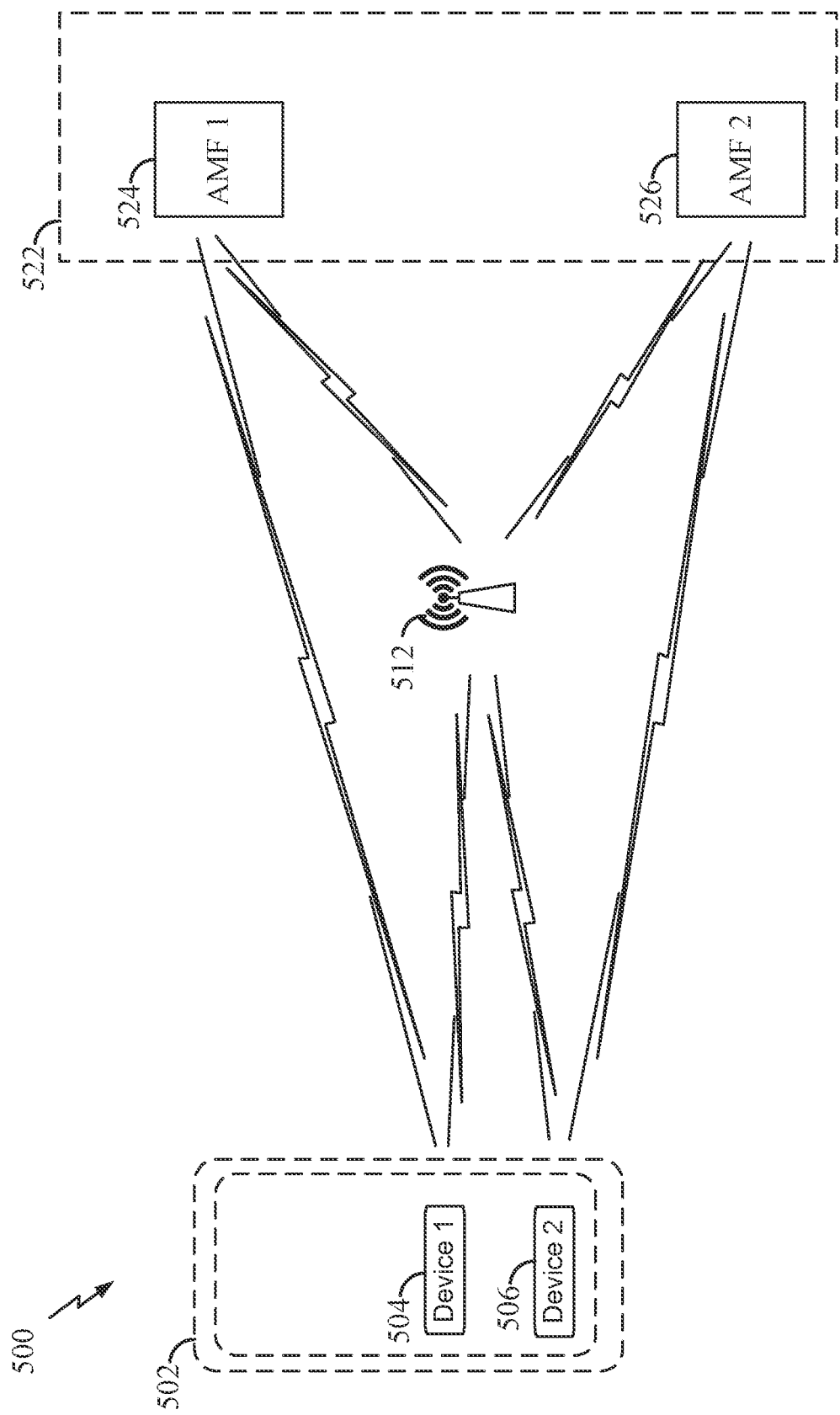
FIG. 5 is an example diagram illustrating communication among multiple subscription modules/devices, a base station, and a core network, according to an aspect of the disclosure.

FIG. 5 is an example diagram 500 illustrating communication among multiple subscription modules/devices, a base station, and a core network, according to an aspect of the disclosure. In FIG. 5, in an aspect, multiple devices may be implemented in a UE 502, where the multiple devices may include a first device 504 associated with a first subscription and a second device 506 associated with a second subscription. In an aspect, the first device 504 may be a first SIM and the second device 506 may be a second SIM. The UE 502 may be a scheduled entity or a base station as illustrated in any one or more of FIGS. 1, 2, 3, and/or 4. For illustrative purposes, a dual-device case with the first device 504 and the second device 506 is shown and explained in FIG. 5. However, it is understood that the disclosure is not limited to a UE with two devices, and more than two devices for more than two subscriptions may be used. Further, in an aspect, the multiple devices may be separate wireless devices that are independently operable, and may not be implemented in the same UE. The first device 504 and the second device 506 may communicate with a base station 512 via respective connections with the base station 512. The base station 512 may be a scheduling entity or a base station as illustrated in any one or more of FIGS. 1, 2, 3, and/or 4. The base station 512 may also communicate with a core network device 522 including a first AMF 524 and a second AMF 526. Although FIG. 5 shows that the first AMF 524 and the second AMF 526 are implemented within the core network device 522, another implementation where the first AMF 524 and the second AMF 526 are implemented in two separate core networks is also possible. In an aspect, the first AMF 524 may communicate with the first device 504 and the second AMF 526 may communicate with the second device 506. The core network device 522 may be a core network illustrated in any one or more of FIGS. 1 and/or 2.

The first device 504 may be used (e.g., by the UE 502) to perform a first network registration with the core network device 522 (e.g., via the first AMF 524), using the first subscription. While performing the first network registration, a paging reference identifier may be associated with the first subscription and/or the first device 504. According to a first approach, the first device 504 may perform the first network registration with the core network device 522 by transmitting a first registration request for the first network registration to the core network device 522 (e.g., via the first AMF 524) using the first subscription, where the first registration request may include a paging reference identifier request to request, such that the core network device 522 (e.g., via the first AMF 524) may allocate a paging reference identifier to associate the paging reference identifier with the first subscription and/or the first device 504. Subsequently, during the first network registration, the core network device 522 (e.g. via the first AMF 524) may transmit a first registration response that includes the paging reference identifier to the first device 504 in response to the first registration request. The first registration response may be received by the first device 504 using the first subscription. The first device 504 may retrieve the paging identifier from the first registration response and convey the paging reference identifier to the second device 506.

According to a second approach, the first device 504 may perform the first network registration with the core network device 522 by allocating a paging reference identifier to associate the paging reference identifier with the first subscription and/or the first device 504, and transmitting a first registration request for the first network registration to the core network device 522 (e.g., via the first AMF 524) using the first subscription, where the first registration request includes the paging reference identifier associated with the first subscription and/or the first device 504. The first device 504 may convey the paging reference identifier to the second device 506. Subsequently, during the second network registration, the core network device 522 (e.g. via the first AMF 524) may transmit a first registration response to the first device 504 in response to the first registration request. In an aspect, the first registration response in the second approach may not include the paging reference identifier associated with the first subscription and/or the first device 504. The first registration response may be received by the first device 504 using the first subscription.

Hence, for example, after the completion of the first network registration, the paging reference identifier may be associated with the first subscription and/or the first device 504. In an aspect, when the first registration request is received, the core network device 522 (e.g., via the first AMF 524) may also allocate a first GUTI (e.g., a first 5G GUTI) associated with the first device 504. In an aspect, the first registration response may further include the first GUTI associated with the first device 504. In an aspect, the paging reference identifier may be allocated independent of the first GUTI. In an aspect, the paging reference identifier may be randomly generated, and may include 10 bits or may include any number of bits.

The second device 506 may be used to perform a first network registration with the core network device 522 (e.g., via the second AMF 526), using the second subscription. While performing the second network registration, the paging reference identifier may be associated further with the second subscription. Hence, after performing the first network registration and the second network registration, the paging reference identifier may be associated with the first subscription and the second subscription. In other words, after the multiple subscriptions/SIMs perform network registrations with the core network, a paging reference may be associated with the multiple subscriptions and thus may be used for the multiple subscriptions. In FIG. 5, the second device 506 may perform the second network registration with the core network device 522 by transmitting a second registration request for the second network registration to the core network device 522 (e.g., via the second AMF 526) using the second subscription, where the second registration request may include the paging reference identifier, such that the core network device 522 (e.g., via the second AMF 526) may associate the paging reference identifier further with the second subscription and/or the second device 506. As such, after the second network registration, the paging reference identifier is associated with the first subscription and/or first device 504 as well as with the second subscription and/or the second device 506. Subsequently, during the second network registration, the core network device 522 (e.g. via the second AMF 526) may transmit a second registration response to the second device 506 in response to the second registration request. The second registration response may be received by the second device 506 using the second subscription.

In an aspect, when the second registration request is received, the core network device 522 (e.g., via the second AMF 526) may also allocate a second GUTI (e.g., a second 5G GUTI) associated with the second device 506. In an aspect, the second registration response may further include the second GUTI associated with the second device 506.

After the first network registration and the second network registration are performed, the core network device 522 may request the base station 512 to page the first device 504 and the second device 506, such that the base station 512 may page the first device 504 and the second device 506 during a paging occasion determined based on the paging reference identifier. For example, the base station 512 may be requested to page the first device 504 and the second device 506 any time after the first network registration and the second network registration are completed. At this point, the paging reference identifier used to determine the paging occasion is associated with the first subscription and/or first device 504 as well as with the second subscription and/or the second device 506. In an aspect, the core network device 522 (e.g., via the first AMF 524 and/or the second AMF 526) may request the base station 512 to transmit one or more paging messages to the first device 504 and the second device 506 during a paging occasion based on the paging reference identifier. In particular, the core network device 522 (e.g., via the first AMF 524) may transmit a first paging request to the base station 512, where the first paging request includes the paging reference identifier and the first device identifier associated with the first device 504, and may transmit a second paging request to the base station 512, where the second paging request includes the paging reference identifier and the second device identifier associated with the second device 506. In an aspect, the first device identifier may be a first TMSI (e.g., first S-TMSI) and the second device identifier is a second TMSI (e.g., second S-TMSI).

When the base station 512 receives the first paging request and the second paging request from the core network device 522, the base station 512 may determine the paging occasion based on the paging reference identifier, and may transmit one or more paging messages to the first device 504 and the second device 506 during the paging occasion, e.g., in response to the first paging request and the second paging request. In an aspect, the one or more paging messages may include one or more paging messages for both the first device 504 and the second device 506*d* including the first and second device identifiers respectively associated with the first device 504 and the second device 506*d*. In an aspect, the one or more paging messages may include a first paging message for the first device 504 including the first device identifier associated with the first device 504 and/or a second paging message for the second device 506 including the second device identifier associated with the second device 506, where the first and second paging messages are transmitted within the common paging occasion. In one example, a paging message including the first and second device identifiers, the first paging message including the first device identifier, and/or the second paging message including the second device identifier may be transmitted within the common paging occasion. Hence, for example, any paging messages for the first device 504 and/or the second device 506 may be transmitted within a single paging occasion, and thus the UE 502 may need to wake up once to monitor paging for the first device 504 and the second device 506, instead of waking up twice to separately monitor paging for the first device 504 and paging for the second device 506.

In an aspect, the base station 512 may further determine a paging frame based on the paging reference identifier, where the base station 512 may transmit the one or more paging messages to the first device 504 and the second device 506 during the paging occasion in the paging frame.

The one or more paging messages may include a first device identifier associated with the first device 504 and a second device identifier associated with the second device 506. Hence, the particular devices to which the one or more paging messages are to be sent may be indicated by the device identifiers such as the first device identifier and the second device identifier included in the one or more paging messages.

In an aspect, the one or more paging messages may be broadcast by the base station 512. In an aspect, the UE 502 (e.g., via the first device 504 and/or the second device 506) may monitor for a paging messages from the base station 512 and identify a device identifier to determine whether the paging message is for the first device 504 or the second device 506 or for both.

In an aspect, after the paging reference identifier is allocated to be associated with the first subscription and/or the first device 504, the UE 502 (e.g., via the first device 504 and/or the second device 506) may determine the paging occasion and/or the paging frame based on the paging reference identifier. In an aspect, the UE 502 and the base station 512 may use the same algorithm or formula to determine the paging occasion and/or the paging frame, such that the UE 502 may monitor for the paging messages based on the common paging occasion and/or the common paging frame used by the base station 512 to transmit the paging messages. Hence, the UE 502 (e.g., via the first device 504 and/or the second device 506) may monitor for the one or more paging messages based on the paging occasion and/or the paging frame determined by the UE 502. In an aspect, the UE 502 (e.g., via the first device 504 and/or the second device 506) may also associate the paging reference identifier further with the second subscription and/or the second device 506, to result in the paging reference identifier associated with the first subscription and/or the first device 504 as well as with the second subscription and/or the second device 506.

In an aspect, a paging reference identifier may be updated to an updated paging reference identifier associated with the first subscription and/or the first device 504 and with the second subscription and/or the second device 506. For example, one or more of the AMFs may change, which may trigger updating of the paging reference identifier. In the first approach explained above, the following process may be performed to update the paging reference identifier, the core network device 522 (e.g., via the first AMF 524) may allocate the paging reference identifier to associate the updated paging reference identifier with the first subscription and/or the first device 504, and transmit the updated paging reference identifier to the first device 504 (e.g., via a network registration procedure and/or a device configuration update procedure). In an aspect, after the first device 504 receives the updated paging reference identifier, the first device 504 may convey the updated paging reference identifier to the second device 506. Subsequently, the second device 506 may transmit a registration update request to the core network device 522 (e.g., to the second AMF 526) for a network registration update, where the registration update request may include the updated paging reference identifier associated with the first subscription and/or the first device 504. Upon receiving the registration update request, the core network device 522 (e.g., via the second AMF 526) may associate the updated paging reference identifier further with the second subscription and/or the second device 506. Hence, the updated paging reference identifier is associated with the first subscription and/or the first device 504 as well as with the second subscription and/or the second device 506.

In the second approach explained above, the following process may be performed to update the paging reference identifier. The first device 504 may allocate the updated paging reference identifier to associate the updated paging reference identifier with the first subscription and/or the first device 504, and may transmit a first registration update request to the core network device 522 (e.g., to the first AMF 524) using the first subscription for a network registration update, where the first registration update including the updated paging reference identifier associated with the first subscription and/or the first device 504. In an aspect, after allocating the updated paging reference identifier associated with the first subscription and/or the first device 504, the first device 504 may convey the updated paging reference identifier to the second device 506. Further, the second device 506 may transmit a second registration update request to the core network device 522 (e.g., to the second AMF 526) using the second subscription, where the second registration update including the updated paging reference identifier, so as to associate the updated paging reference identifier further with the second subscription and/or the second device 506. In particular, upon receiving the second registration update request, the core network device 522 (e.g., via the second AMF 526) may associate the updated paging reference identifier further with the second subscription, such that the updated paging reference identifier is associated with the first subscription and/or the first device 504 as well as with the second subscription and/or the second device 506.

Figure 6:
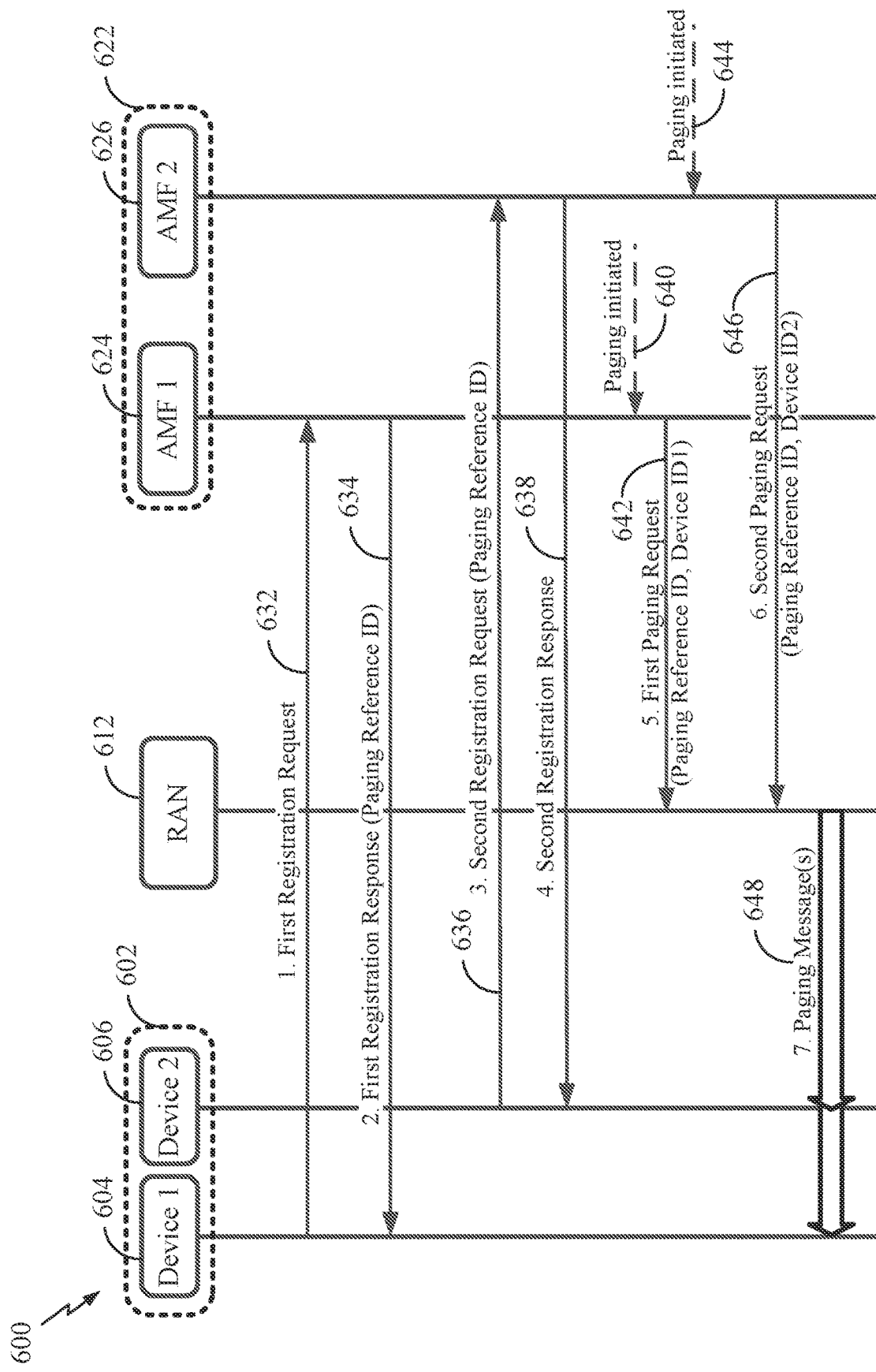
FIG. 6 is a flow diagram illustrating a process to page multiple devices during a common paging occasion, according to an aspect of the disclosure.

FIG. 6 is a flow diagram 600 illustrating a process to page multiple devices during a common paging occasion, according to an aspect of the disclosure. The process in FIG. 7 may be performed using a first device 604, a second device 606, a RAN 612, and a core network device 622. The first device 604 and the second device 606 may respectively be a first SIM (e.g., first device 504) and a second SIM (e.g., second device 506). The first device 604 and the wireless device 406 may be implemented within a UE 602 or may exist as separate wireless devices that are independently operable. The RAN 612 may be a base station such as the base station 512. The core network device 622 may include a first AMF 624 (e.g., first AMF 524) and a second AMF 626 (e.g., second AMF 526). In an aspect, the flow diagram 700 may correspond to the first approach explained above with reference to FIG. 5.

The first device 604 first performs a first network registration with the core network device 622. In particular, at 632, the first device 604 transmits a first registration request to the core network device 622 (e.g., to the first AMF 624) for the first network registration, using a first subscription of the first device 604. Subsequently, the first AMF 624 allocates a paging reference identifier (ID) to associate the paging reference identifier with the first subscription and/or the first device 604, and may further allocate a first device identifier (e.g., first 5G GUTI) associated with the first device 604. The core network device 622 (e.g., via the first AMF 624) may store the paging reference identifier for the UE 602. At 634, the core network device 622 (e.g., via the first AMF 624) transmits a first registration response including the paging reference identifier to the first AMF 624. e.g., using the first subscription.

When the first device 604 receives the first registration response, the first device 604 may retrieve the paging reference identifier from the first registration response and convey the paging reference identifier to the second device

606. In an aspect, the second device 606 may associate the paging reference identifier further with the second device 606. At 634, the second device 606 transmits a second registration request to the core network (e.g., to the second AMF 626) using a second subscription of the second device 606, where the second registration request includes the paging reference identifier. When the second AMF 626 receives the second registration request with the paging reference identifier, the second AMF 626 may associate the paging reference identifier further with the second device 606 and may allocate a second device identifier (e.g., second 5G GUTI) associated with the second device 606. At 638, the core network (e.g., via the second AMF 626) may transmit a second registration response to the second device 606, e.g., using the second subscription.

After the first and second network registrations are completed, the first AMF 624 and the second AMF 626 may request the RAN 612 to page the first device 604 and the second device 606. At 640, the core network device 622 (e.g., via the first AMF 624) may initiate paging for the first device 604. Subsequently, at 642, the core network device 622 (e.g., via the first AMF 624) may transmit the first paging request for the first device 604 to the RAN 612, where the first paging request includes the paging reference identifier and the first device identifier. At 644, the core network device 622 (e.g., via the second AMF 626) may initiate paging for the second device 606. Subsequently, at 646, the core network device 622 (e.g., via the second AMF 626) may transmit the second paging request for the second device 606 to the RAN 612, where the second paging request includes the paging reference identifier and the second device identifier.

When the RAN 612 receives the paging reference identifier via the first paging request and/or the second paging request, the RAN 612 may determine a paging occasion and/or a paging frame based on the paging reference identifier. The first device 604 and/or the second device 606 may also determine the paging occasion and/or the paging frame based on the paging reference identifier. Based on the paging occasion and/or the paging frame, at 648, the RAN 612 transmits one or more paging messages to the first device 604 and the second device 606. As discussed above, the one or more paging messages may include a paging message including the first and second device identifiers, a paging message including the first device identifier, and/or a paging message including the second device identifier. The first device 604 and/or the second device 606 may monitor for a paging message during the paging occasion and/or in the paging frame, and may receive the one or more paging messages based on such monitoring and one or more device identifiers included in each paging message.

Figure 7:
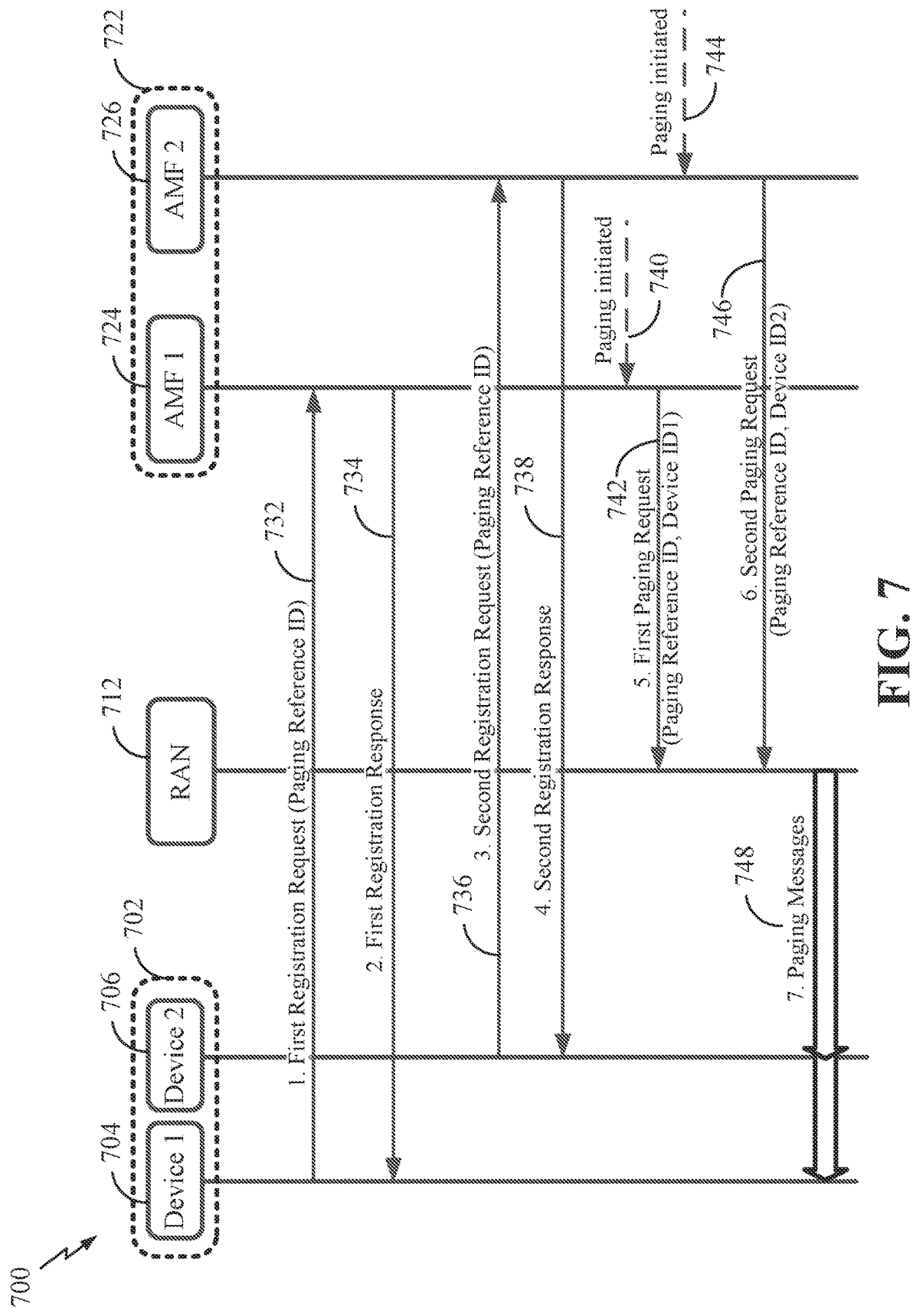
FIG. 7 is a flow diagram illustrating a process to page multiple devices during a common paging occasion, according to an aspect of the disclosure.

FIG. 7 is a flow diagram 700 illustrating a process to page multiple devices during a common paging occasion, according to an aspect of the disclosure. The process in FIG. 7 may be performed using a first device 704, a second device 706, a RAN 712, and a core network device 722. The first device 704 and the second device 706 may respectively be a first SIM (e.g., first device 504) and a second SIM (e.g., second device 506). The first device 704 and the wireless device 406 may be implemented within a UE 702 or may exist as separate wireless devices that are independently operable. The RAN 712 may be a base station such as the base station 512. The core network device 722 may include a first AMF 724 (e.g., first AMF 524) and a second AMF 726 (e.g., second AMF 526). In an aspect, the flow diagram 700 may correspond to the second approach explained above with reference to FIG. 5.

The first device 704 first performs a first network registration with the core network device 722. In particular, the first device 704 may allocates a paging reference identifier (ID) to associate the paging reference identifier with the first subscription and/or the first device 704. At 732, the first device 704 transmits a first registration request to the core network device 722 (e.g., to the first AMF 724) for the first network registration, using a first subscription of the first device 704, where the first registration request includes the paging reference identifier. Subsequently, the first AMF 724 may allocate a first device identifier (e.g., first 5G GUTI) associated with the first device 704. The core network device 722 (e.g., via the first AMF 724) may store the paging reference identifier for the UE 702. At 734, the core network device 722 (e.g., via the first AMF 724) transmits a first registration response to the first AMF 724, e.g., using the first subscription.

In an aspect, the first device 704 may convey the paging reference identifier to the second device 706. In an aspect, the second device 706 may associate the paging reference identifier further with the second device 706. After the first device 704 receives the first registration response, at 734, the second device 706 transmits a second registration request to the core network (e.g., to the second AMF 726) using a second subscription of the second device 706, where the second registration request includes the paging reference identifier. When the second AMF 726 receives the second registration request with the paging reference identifier, the second AMF 726 may associate the paging reference identifier further with the second device 706 and may allocate a second device identifier (e.g., second 5G GUTI) associated with the second device 706. At 738, the core network (e.g., via the second AMF 726) may transmit a second registration response to the second device 706, e.g., using the second subscription.

After the first and second network registrations are completed, the first AMF 724 and the second AMF 726 may request the RAN 712 to page the first device 704 and the second device 706. At 740, the core network device 722 (e.g., via the first AMF 724) may initiate paging for the first device 704. Subsequently, at 742, the core network device 722 (e.g., via the first AMF 724) may transmit the first paging request for the first device 704 to the RAN 712, where the first paging request includes the paging reference identifier and the first device identifier. At 744, the core network device 722 (e.g., via the second AMF 726) may initiate paging for the second device 706. Subsequently, at 746, the core network device 722 (e.g., via the second AMF 726) may transmit the second paging request for the second device 706 to the RAN 712, where the second paging request includes the paging reference identifier and the second device identifier.

When the RAN 712 receives the paging reference identifier via the first paging request and/or the second paging request, the RAN 712 may determine a paging occasion and/or a paging frame based on the paging reference identifier. The first device 704 and/or the second device 706 may also determine the paging occasion and/or the paging frame based on the paging reference identifier. Based on the paging occasion and/or the paging frame, at 748, the RAN 712 transmits one or more paging messages to the first device 704 and the second device 706. As discussed above, the one or more paging messages may include a paging message including the first and second device identifiers, a paging message including the first device identifier, and/or a paging message including the second device identifier. The first device 704 and/or the second device 706 may monitor for a paging message during the paging occasion and/or in the paging frame, and may receive the one or more paging messages based on such monitoring and one or more device identifiers included in each paging message.

Figure 8:
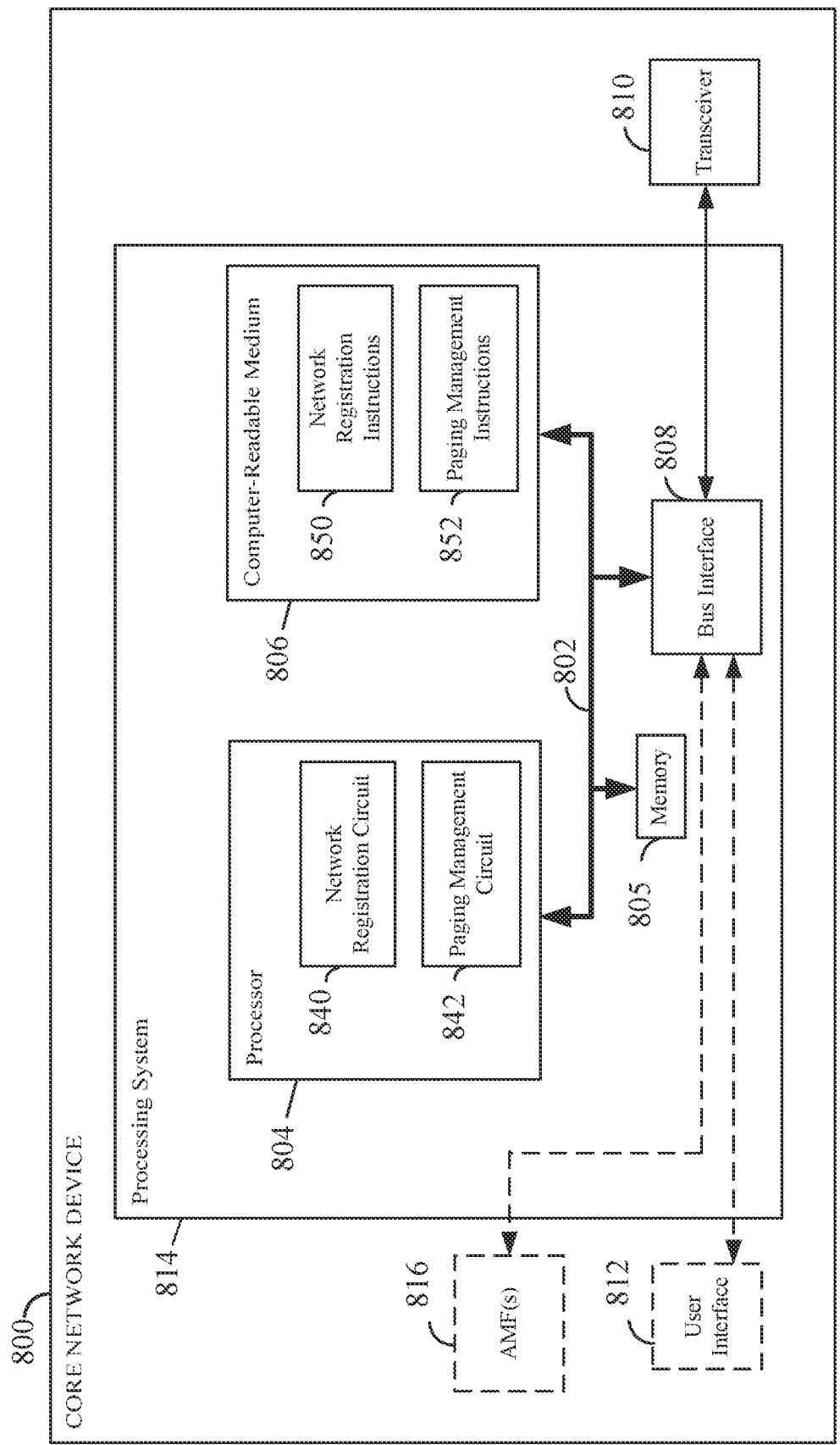
FIG. 8 is a block diagram conceptually illustrating an example of a hardware implementation for a core network device according to some aspects of the disclosure.

FIG. 8 is a block diagram illustrating an example of a hardware implementation for a core network device 800 employing a processing system 814. For example, the core network device 800 may be a core network/core network device as illustrated in any one or more of FIGS. 1, 2, 5, 6, and/or 7.

The core network device 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the core network device 800 may be configured to perform any one or more of the functions described herein. That is, the processor 804, as utilized in a core network device 800, may be used to implement any one or more of the processes and procedures described below and illustrated in FIG. 9.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and processor-readable storage media (represented generally by the processor-readable storage medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. In an aspect, the core network device 800 may include one or more AMFs 816 that may be used to perform a network registration with another device such as a UE. In such an aspect, the bus interface 808 may provide an interface between the bus 802, the transceiver 810, and the one or more AMFs 816. In an aspect, the one or more AMFs 816 may be used to request a base station to page a UE. Depending upon the nature of the apparatus, a user interface 812 (e.g., keypad, display, speaker, microphone, joystick) may also be provided. Of course, such a user interface 812 is optional, and may be omitted in some examples, such as a base station.

In some aspects of the disclosure, the processor 804 may include network registration circuitry 840 configured for various functions, including, for example, performing a first network registration with a first wireless device using a first subscription, wherein performing the first network registration includes associating a paging reference identifier with the first subscription. For example, the network registration circuitry 840 may be configured to implement one or more of the functions described below in relation to FIG. 9, including, e.g., block 902.

In some aspects of the disclosure, the network registration circuitry 840 may be configured for various functions, including, for example, performing a second network registration with a second wireless device using a second subscription, wherein performing the second network registration includes associating the paging reference identifier further with the second subscription. For example, the network registration circuitry 840 may be configured to implement one or more of the functions described below in relation to FIG. 9, including, e.g., block 904.

In some aspects of the disclosure, the processor 804 may include paging management circuitry 842 configured for various functions, including, for example, requesting a base station to page the first wireless device and the second wireless device during a paging occasion based on the paging reference identifier. For example, the paging management circuitry 842 may be configured to implement one or more of the functions described below in relation to FIG. 9, including, e.g., block 906.

In some aspects of the disclosure, the paging management circuitry 842 may be configured for various functions, including, for example, updating the paging reference identifier to associate the updated paging reference identifier with the first subscription and the second subscription. For example, the paging management circuitry 842 may be configured to implement one or more of the functions described below in relation to FIG. 9, including, e.g., block 908.

The processor 804 is responsible for managing the bus 802 and general processing, including the execution of software stored on the processor-readable storage medium 806. The software, when executed by the processor 804, causes the processing system 814 to perform the various functions described below for any particular apparatus. The processor-readable storage medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 806. The processor-readable storage medium 806 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 806 may reside in the processing system 814, external to the processing system 814, or distributed across multiple entities including the processing system 814. The processor-readable storage medium 806 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 806 include network registration software/instructions 850 configured for various functions, including, for example, performing a first network registration with a first wireless device using a first subscription, wherein performing the first network registration includes associating a paging reference identifier with the first subscription. For example, the network registration software/instructions 850 may be configured to implement one or more of the functions described below in relation to FIG. 9, including, e.g., block 902.

In some aspects of the disclosure, the network registration software/instructions 850 may be configured for various functions, including, for example, performing a second network registration with a second wireless device using a second subscription, wherein performing the second network registration includes associating the paging reference identifier further with the second subscription. For example, the network registration software/instructions 850 may be configured to implement one or more of the functions described below in relation to FIG. 9, including, e.g., block 904.

In some aspects of the disclosure, the processor-readable storage medium 806 may include paging management software/instructions 852 configured for various functions, including, for example, requesting a base station to page the first wireless device and the second wireless device during a paging occasion based on the paging reference identifier. For example, the paging management software/instructions 852 may be configured to implement one or more of the functions described below in relation to FIG. 9, including, e.g., block 906.

In some aspects of the disclosure, the paging management software/instructions 852 may be configured for various functions, including, for example, updating the paging reference identifier to associate the updated paging reference identifier with the first subscription and the second subscription. For example, the paging management software/instructions 852 may be configured to implement one or more of the functions described below in relation to FIG. 9, including, e.g., block 908.

Figure 9:
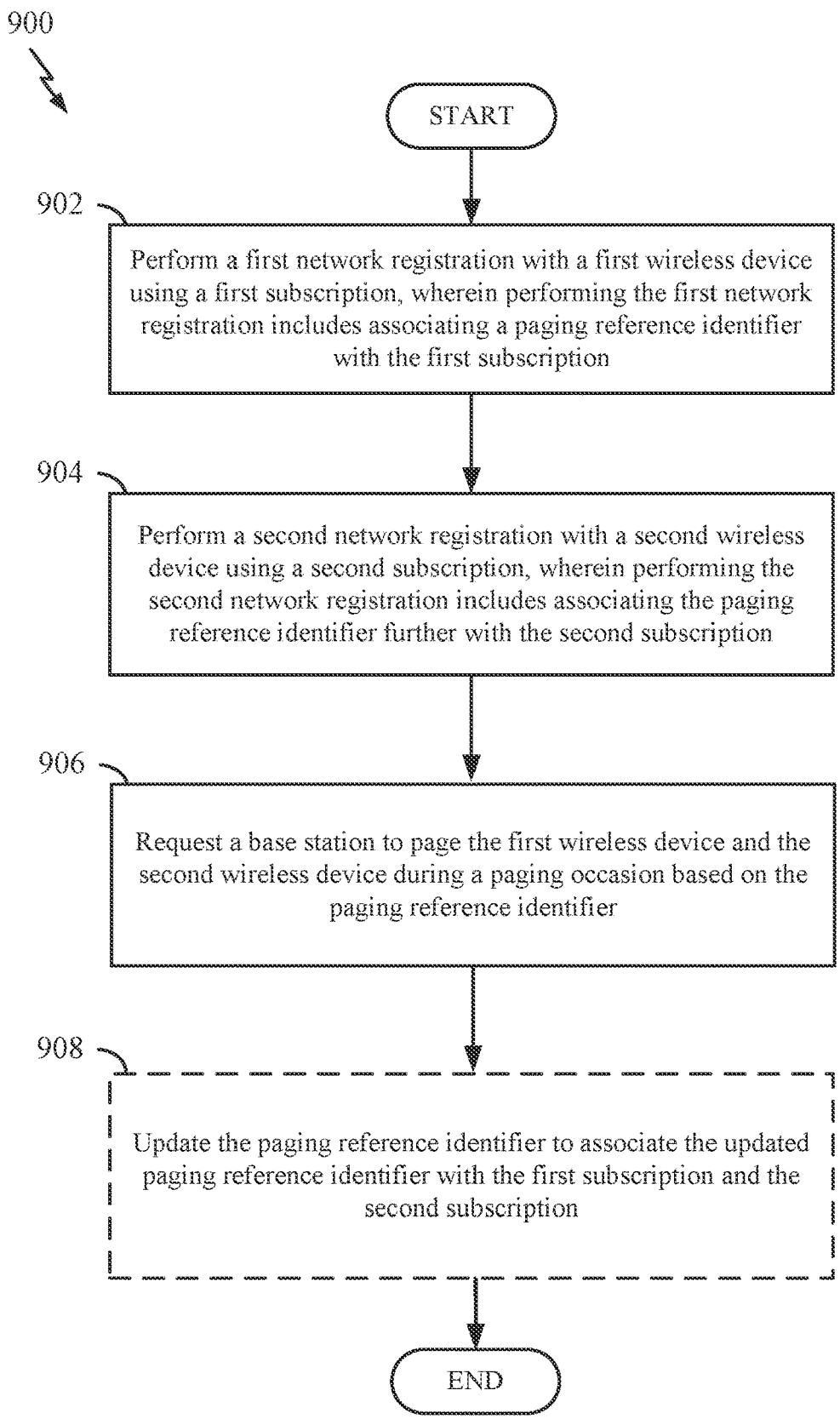
FIG. 9 is a flow chart illustrating an exemplary process for wireless communication by a core network device, according to some aspects of the disclosure.

FIG. 9 is a flow chart illustrating an exemplary process 900 for wireless communication by a core network device, in accordance with some aspects of the present disclosure. As described below, some or all illustrated features may be omitted in a particular implementation within the scope of the present disclosure, and some illustrated features may not be required for implementation of all embodiments. In some examples, the process 900 may be carried out by the core network device 800 illustrated in FIG. 8. In some examples, the process 900 may be carried out by any suitable apparatus or means for carrying out the functions or algorithm described below.

At block 902, the process 900 includes performing a first network registration with a first wireless device using a first subscription, wherein performing the first network registration includes associating a paging reference identifier with the first subscription.

In an aspect, according the first approach, performing the first network registration at block 902 may include receiving a first registration request for the first network registration from the first wireless device using the first subscription, the first registration request including a paging reference identifier request, allocating the paging reference identifier to associate the paging reference identifier with the first subscription in response to the paging reference identifier request, and transmitting a first registration response including the paging reference identifier to the first wireless device in response to the first registration request. In an aspect, the first registration response may further include a first GUTI associated with the first wireless device. In an aspect, the first registration request may be received at a first AMF of the core network device 800, and the first registration response may be transmitted from the first AMF.

In an aspect, according to the second approach, performing the first network registration at block 902 may include receiving a first registration request for the first network registration from the first wireless device using the first subscription, the first registration request including the paging reference identifier associated with the first subscription, and transmitting a first registration response including the paging reference identifier to the first wireless device in response to the first registration request. In an aspect, the first registration request may be received at a first AMF of the core network device 800, and the first registration response may be transmitted from the first AMF.

At block 904, the process 900 includes performing a second network registration with a second wireless device using a second subscription, wherein performing the second network registration includes associating the paging reference identifier further with the second subscription.

In an aspect, performing the second network registration at block 904 may include receiving a second registration request for the second network registration from the second wireless device using the second subscription, the second registration request including the paging reference identifier, associating the paging reference identifier further with the second subscription; and transmitting a second registration response to the second wireless device in response to the second registration request. In an aspect, the second registration request may be received at a second AMF of the core network device 800, and the second registration response may be transmitted from the second AMF. In an aspect, the second registration response may include a second GUTI associated with the second wireless device.

At block 906, the process 900 includes requesting a base station to page the first wireless device and the second wireless device during a paging occasion based on the paging reference identifier.

In an aspect, requesting the base station to page the first and second wireless devices at block 906 may include requesting the base station to transmit one or more paging messages to the first wireless device and the second wireless device during a paging occasion based on the paging reference identifier, the one or more paging messages including a first device identifier associated with the first wireless device and a second device identifier associated with the second wireless device. In an aspect, the one or more paging messages are transmitted in a paging frame based on the paging reference identifier. In an aspect, the first device identifier is a first TMSI and the second device identifier is a second TMSI.

In an aspect, requesting the base station to transmit the one or more paging messages at block 906 may include transmitting, to the base station, a first paging request including the paging reference identifier and the first device identifier associated with the first wireless device, and transmitting, to the base station, a second paging request including the paging reference identifier and the second device identifier associated with the second wireless device. In this aspect, the first paging request and the second paging request cause the base station to transmit the one or more paging messages to the first wireless device and the second wireless device.

At block 908, in an aspect, the process 900 may include updating the paging reference identifier to associate the updated paging reference identifier with the first subscription and the second subscription.

In an aspect, according to the first approach, updating the paging reference identifier at block 908 may include allocating the updated paging reference identifier to associate the updated paging reference identifier with the first subscription; transmitting the updated paging reference identifier to the first wireless device, receiving a registration update request from the second wireless device, the registration update request including the updated paging reference identifier, and associating the updated paging reference identifier further with the second subscription. In an aspect, the updated paging reference identifier is transmitted to the first wireless device via at least one of a network registration procedure or a device configuration update procedure.

In an aspect, according to the second approach, updating the paging reference identifier at block 908 may include receiving a first registration update request from the first wireless device, the first registration update including the updated paging reference identifier associated with the first subscription, receiving a second registration update request from the second wireless device, the second registration update including the updated paging reference identifier, and associating the updated paging reference identifier further with the second subscription.

In an aspect, the paging reference identifier may be allocated independent of a first GUTI associated with the first wireless device. In an aspect, the first wireless device and the second wireless device may be a first SIM and a second SIM implemented within a UE, respectively. In an aspect, the first wireless device and the second wireless device may be separately operable.

In one configuration, the core network device 800 for wireless communication includes means for performing a first network registration with a first wireless device using a first subscription, wherein performing the first network registration includes associating a paging reference identifier with the first subscription, means for performing a second network registration with a second wireless device using a second subscription, wherein performing the second network registration includes associating the paging reference identifier further with the second subscription, and means for requesting a base station to page the first wireless device and the second wireless device during a paging occasion based on the paging reference identifier, and may further include means for updating the paging reference identifier to associate the updated paging reference identifier with the first subscription and the second subscription. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the processor-readable storage medium 806, or any other suitable apparatus or means described in any one of the FIGS. 1, 2, 5, 6, and/or 7, and utilizing, for example, the processes and/or algorithms described herein in relation to FIG. 9.

Figure 10:
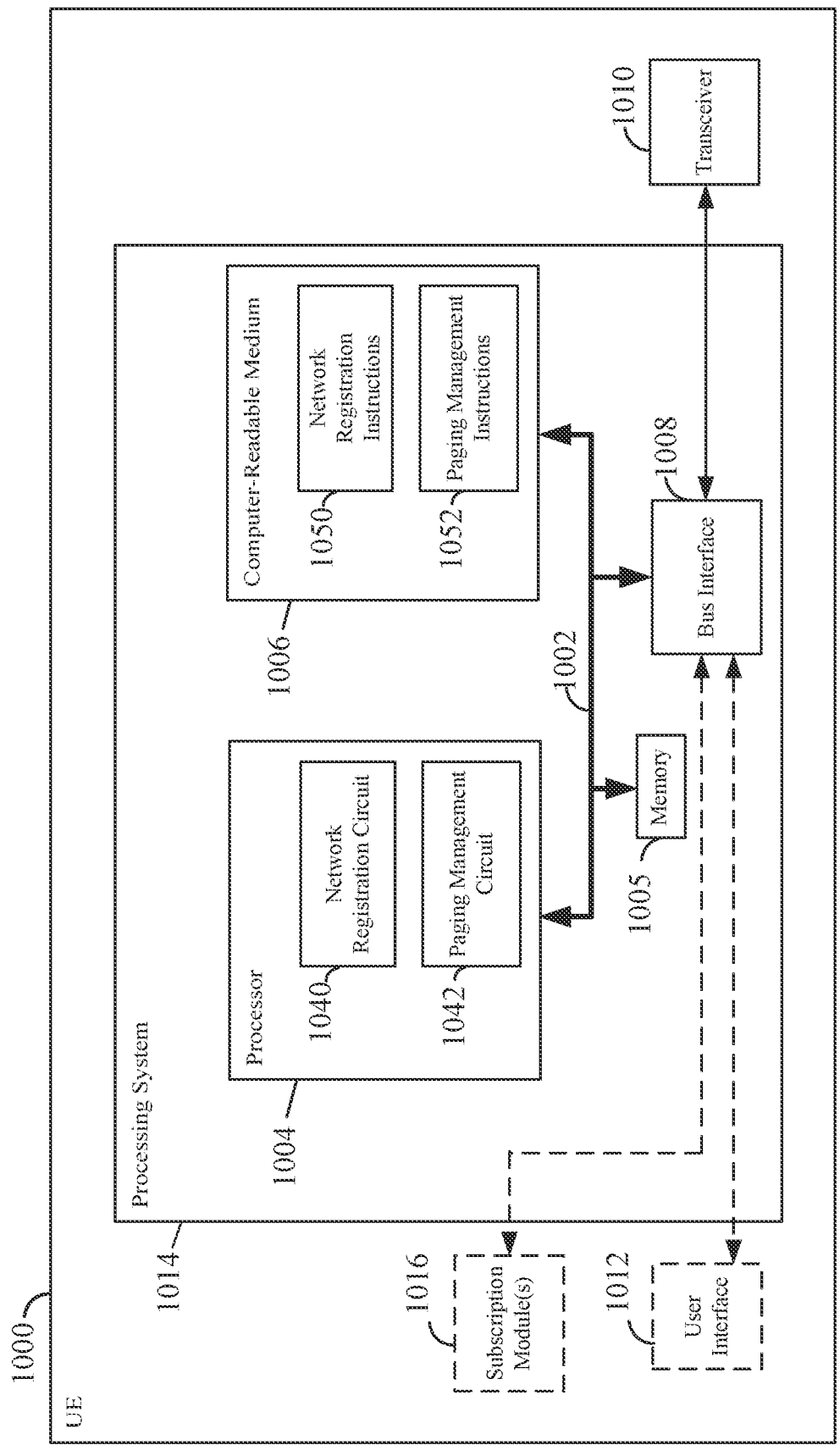
FIG. 10 is a block diagram conceptually illustrating an example of a hardware implementation for a user equipment according to some aspects of the disclosure.

FIG. 10 is a block diagram illustrating an example of a hardware implementation for a UE 1000 employing a processing system 1014. For example, the UE 1000 may be a UE as illustrated in any one or more of FIGS. 1, 2, 3, 5, 6, and/or 7.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described below and illustrated in FIG. 11.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and processor-readable storage media (represented generally by the processor-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. In an aspect, the UE 1000 may include a subscription module 1016 that may be used to register with a service network. In such an aspect, the bus interface 1008 may provide an interface between the bus 1002, the transceiver 1010, and the subscription module 1016. In an aspect, the subscription module 1016 may enable the UE 1000 to use multiple subscriptions, such as a first subscription and a second subscription, to provide a service. The subscription module 1016 may include multiple subscription modules respectively for the multiple subscriptions. Depending upon the nature of the apparatus, a user interface 1012 (e.g., keypad, display, speaker, microphone, joystick) may also be provided. Of course, such a user interface 1012 is optional, and may be omitted in some examples, such as a base station.

In some aspects of the disclosure, the processor 1004 may include network registration circuitry 1040 configured for various functions, including, for example, performing a first network registration with a core network device using a first subscription of the UE, wherein performing the first network registration includes associating a paging reference identifier with the first subscription. For example, the network registration circuitry 1040 may be configured to implement one or more of the functions described below in relation to FIG. 11, including, e.g., block 1102.

In some aspects of the disclosure, the network registration circuitry 1040 may be configured for various functions, including, for example, performing a second network registration with the core network device using a second subscription of the UE, wherein performing the second network registration includes associating the paging reference identifier further with the second subscription. For example, the network registration circuitry 1040 may be configured to implement one or more of the functions described below in relation to FIG. 11, including, e.g., block 1104.

In some aspects of the disclosure, the processor 1004 may include paging management circuitry 1042 configured for various functions, including, for example, receiving, from a base station, one or more page messages associated with the first subscription and the second subscription during a paging occasion based on the paging reference identifier. For example, the paging management circuitry 1042 may be configured to implement one or more of the functions described below in relation to FIG. 11, including, e.g., block 1106.

In some aspects of the disclosure, the paging management circuitry 1042 may be configured for various functions, including, for example, updating the paging reference identifier to associate the updated paging reference identifier with the first subscription and the second subscription. For example, the paging management circuitry 1042 may be configured to implement one or more of the functions described below in relation to FIG. 11, including, e.g., block 1108.

The processor 1004 is responsible for managing the bus 1002 and general processing, including the execution of software stored on the processor-readable storage medium 1006. The software, when executed by the processor 1004, causes the processing system 1014 to perform the various functions described below for any particular apparatus. The processor-readable storage medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1006. The processor-readable storage medium 1006 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1006 may reside in the processing system 1014, external to the processing system 1014, or distributed across multiple entities including the processing system 1014. The processor-readable storage medium 1006 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 1006 include network registration software/instructions 1050 configured for various functions, including, for example, performing a first network registration with a core network device using a first subscription of the UE, wherein performing the first network registration includes associating a paging reference identifier with the first subscription. For example, the network registration software/instructions 1050 may be configured to implement one or more of the functions described below in relation to FIG. 11, including, e.g., block 1102.

In some aspects of the disclosure, the network registration software/instructions 1050 may be configured for various functions, including, for example, performing a second network registration with the core network device using a second subscription of the UE, wherein performing the second network registration includes associating the paging reference identifier further with the second subscription. For example, the network registration software/instructions 1050 may be configured to implement one or more of the functions described below in relation to FIG. 11, including, e.g., block 1104.

In some aspects of the disclosure, the processor-readable storage medium 1006 may include paging management software/instructions 1052 configured for various functions, including, for example, receiving, from a base station, one or more page messages associated with the first subscription and the second subscription during a paging occasion based on the paging reference identifier. For example, the paging management software/instructions 1052 may be configured to implement one or more of the functions described below in relation to FIG. 11, including, e.g., block 1106.

In some aspects of the disclosure, the paging management software/instructions 1052 may be configured for various functions, including, for example, updating the paging reference identifier to associate the updated paging reference identifier with the first subscription and the second subscription. For example, the paging management software/instructions 1052 may be configured to implement one or more of the functions described below in relation to FIG. 11, including, e.g., block 1108.

Figure 11:
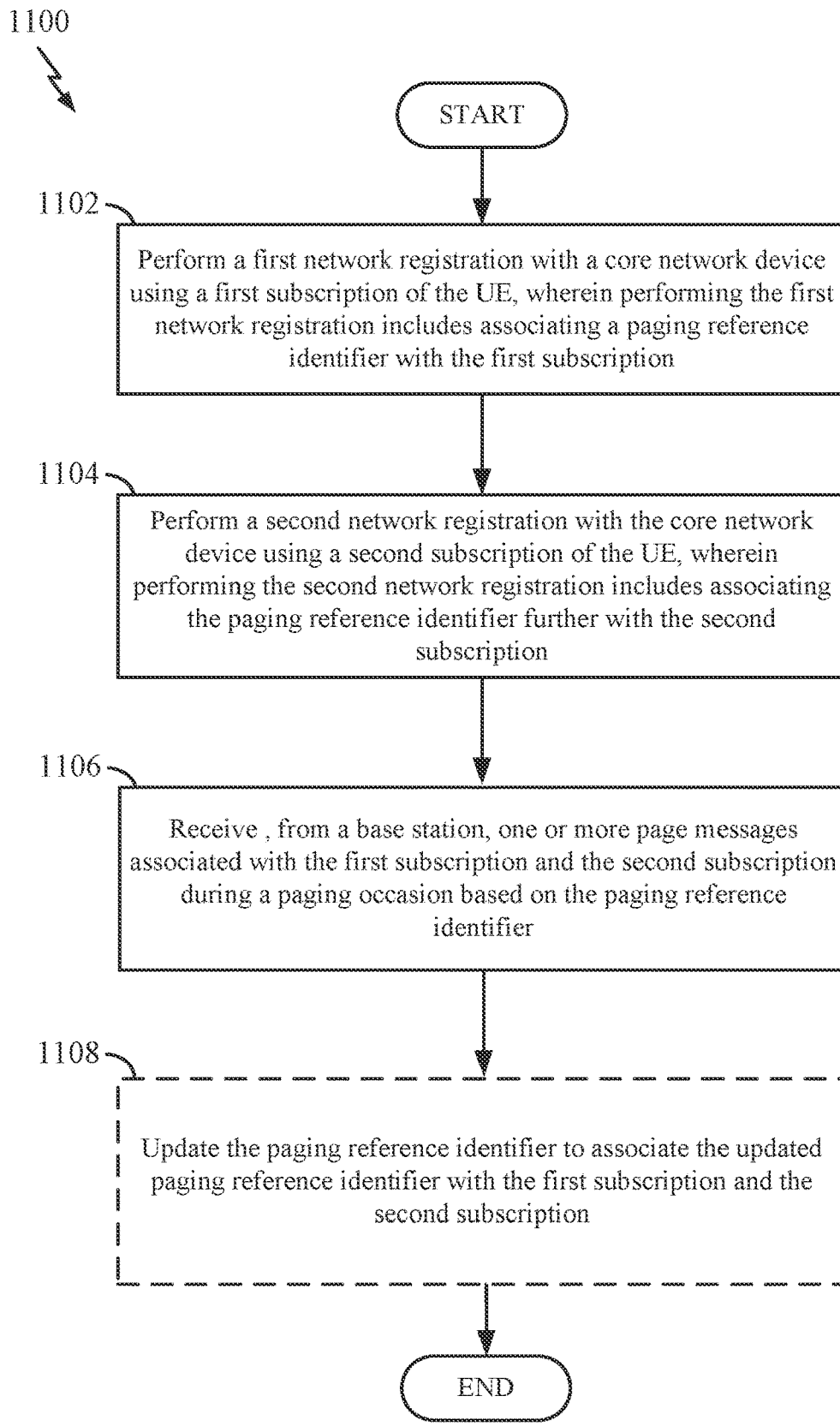
FIG. 11 is a flow chart illustrating an exemplary process for wireless communication by a user equipment, according to some aspects of the disclosure.

FIG. 11 is a flow chart illustrating an exemplary process 1100 for wireless communication by a core network device, in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the UE 1000 illustrated in FIG. 10. In some examples, the process 1100 may be carried out by any suitable apparatus or means for carrying out the functions or algorithm described below.

At block 1102, the process 1100 includes performing a first network registration with a core network device using a first subscription of the UE, wherein performing the first network registration includes associating a paging reference identifier with the first subscription.

In an aspect, according to the first approach, performing the first network registration at block 1102 may include transmitting, to the core network device, a first registration request for the first network registration using the first subscription, the first registration request including a paging reference identifier request, and receiving, from the core network device, a first registration response including the paging reference identifier associated with the first subscription in response to the first registration request. In an aspect, the first registration response may further include a first GUTI associated with the first subscription. In an aspect, the first registration request may be transmitted to a first AMF of the core network device, and the first registration response may be received from the first AMF.

In an aspect, according to the second approach, performing the first network registration at block 1102 may include allocating the paging reference identifier to associate the paging reference identifier with the first subscription, transmitting, to the core network device, a first registration request for the first network registration using the first subscription, the first registration request including the paging reference identifier associated with the first subscription, and receiving, from the core network device, a first registration response in response to the first registration request. In an aspect, the first registration request may be transmitted to a first AMF of the core network device, and the first registration response may be received from the first AMF.

At block 1104, the process 1100 includes performing a second network registration with the core network device using a second subscription of the UE, wherein performing the second network registration includes associating the paging reference identifier further with the second subscription.

In an aspect, performing the second network registration at block 1104 may include transmitting, to the core network device, a second registration request for the second network registration using the second subscription, the second registration request including the paging reference identifier, and receiving, from the core network device, a second registration response in response to the second registration request. In an aspect, the second registration request may be transmitted to a second AMF of the core network device, and the second registration response may be received from the second AMF. In an aspect, the second registration response may include a second GUTI associated with the second subscription.

In an aspect, the one or more paging messages may include a first device identifier associated with the first subscription and a second device identifier associated with the second subscription. In an aspect, the first device identifier may be a first TMSI and the second device identifier may be a second TMSI.

At block 1106, the process 1100 includes receiving, from a base station, one or more page messages associated with the first subscription and the second subscription during a paging occasion based on the paging reference identifier.

In an aspect, receiving the one or more page messages at block 1106 may include determining the paging occasion based on the paging reference identifier, and monitoring for the one or more page messages during the paging occasion to receive the one or more page messages during the paging occasion. In an aspect, the one or more paging messages may be received in a paging frame based on the paging reference identifier.

At block 1108, in an aspect, the process 1100 may include updating the paging reference identifier to associate the updated paging reference identifier with the first subscription and the second subscription.

In an aspect, according to the first approach, updating the paging reference identifier at block 1108 may include receiving, from the core network device, the updated paging reference identifier associated with the first subscription using the first subscription, and transmitting, to the core network device, a registration update request using the second subscription, the registration update request including the updated paging reference identifier to associate the updated paging reference identifier further with the second subscription. In an aspect, the updated paging reference identifier may be received via at least one of a network registration procedure or a device configuration update procedure.

In an aspect, according to the second approach, updating the paging reference identifier at block 1108 may include allocating the updated paging reference identifier to associate the updated paging reference identifier with the first subscription, transmitting, to the core network device, a first registration update request using the first subscription, the first registration update including the updated paging reference identifier associated with the first subscription, and transmitting, to the core network device, a second registration update request using the second subscription, the second registration update including the updated paging reference identifier to associate the updated paging reference identifier further with the second subscription.

In an aspect, the paging reference identifier is allocated independent of a first GUTI associated with the first subscription. In an aspect, the first subscription and the second subscription are respectively associated with a first SIM and a second SIM implemented within the UE.

In one configuration, the UE 1000 for wireless communication includes means for performing a first network registration with a core network device using a first subscription of the UE, wherein performing the first network registration includes associating a paging reference identifier with the first subscription, means for performing a second network registration with the core network device using a second subscription of the UE, wherein performing the second network registration includes associating the paging reference identifier further with the second subscription, and means for receiving, from a base station, one or more page messages associated with the first subscription and the second subscription during a paging occasion based on the paging reference identifier, and may further include means for updating the paging reference identifier to associate the updated paging reference identifier with the first subscription and the second subscription. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the processor-readable storage medium 1006, or any other suitable apparatus or means described in any one of the FIGS. 1, 2, 3, 4, 5, 6, and/or 7, and utilizing, for example, the processes and/or algorithms described herein in relation to FIG. 10.

Figure 12:
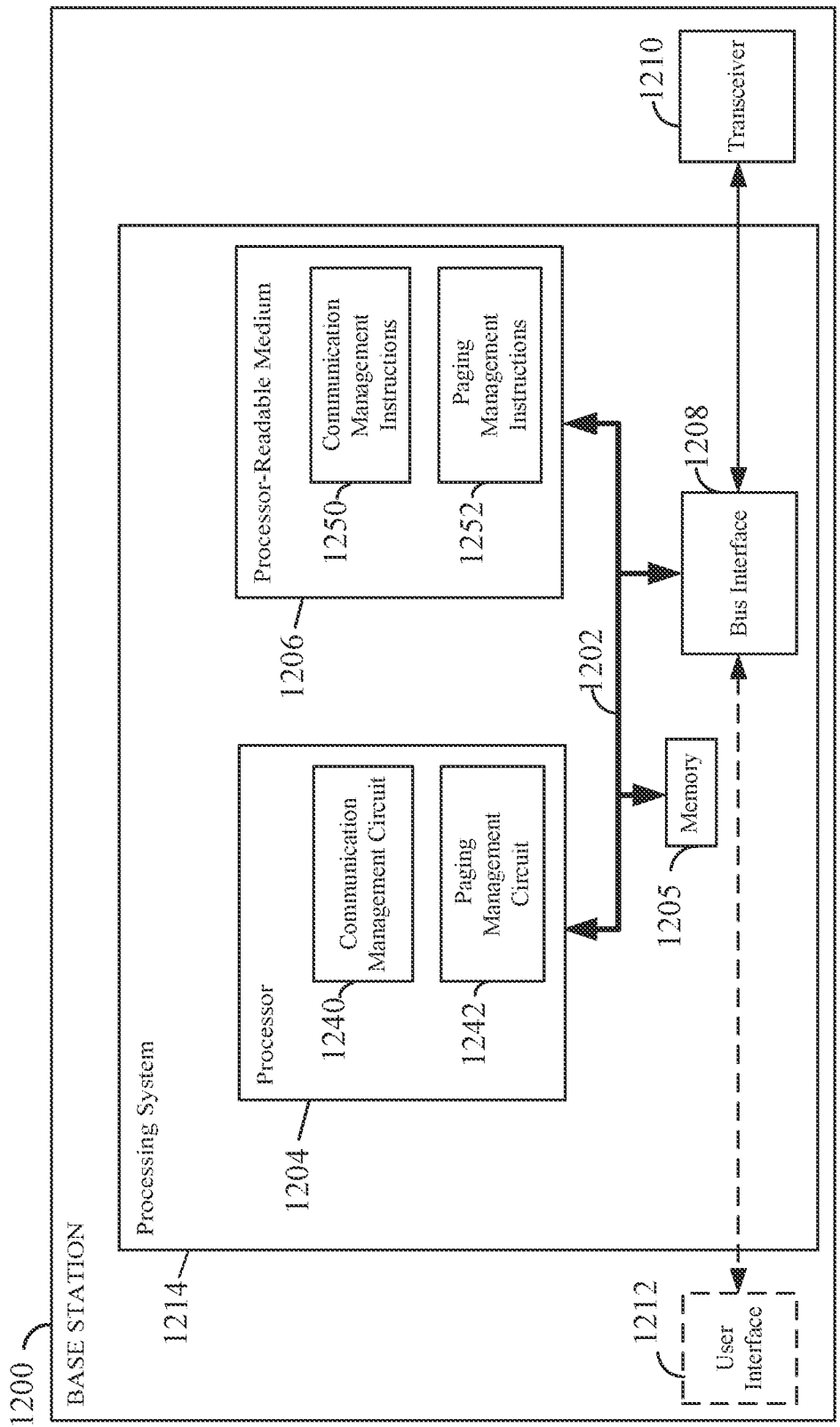
FIG. 12 is a block diagram conceptually illustrating an example of a hardware implementation for a base station according to some aspects of the disclosure.

FIG. 12 is a block diagram illustrating an example of a hardware implementation for a base station 1200 employing a processing system 1214. For example, the base station 1200 may be a base station as illustrated in any one or more of FIGS. 1, 2, 3, 5, 6, and/or 7.

The base station 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1200 may be configured to perform any one or more of the functions described herein. That is, the processor 1204, as utilized in a base station 1200, may be used to implement any one or more of the processes and procedures described below and illustrated in FIG. 13.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and processor-readable storage media (represented generally by the processor-readable storage medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. Depending upon the nature of the apparatus, a user interface 1212 (e.g., keypad, display, speaker, microphone, joystick) may also be provided. Of course, such a user interface 1212 is optional, and may be omitted in some examples, such as a base station.

In some aspects of the disclosure, the processor 1204 may include communication management circuitry 1240 configured for various functions, including, for example, receiving, from a core network device, a first paging request including a paging reference identifier and a first device identifier associated with a first wireless device configured to communicate using a first subscription. For example, the communication management circuitry 1240 may be configured to implement one or more of the functions described below in relation to FIG. 13, including, e.g., block 1302.

In some aspects of the disclosure, the communication management circuitry 1240 may be configured for various functions, including, for example, receiving, from the core network device, a second paging request including the paging reference identifier and a second device identifier associated with a second wireless device configured to communicate using a second subscription, wherein the paging reference identifier is associated with the first and second subscriptions. For example, the communication management circuitry 1240 may be configured to implement one or more of the functions described below in relation to FIG. 13, including, e.g., block 1304.

In some aspects of the disclosure, the processor 1204 may include paging management circuitry 1242 configured for various functions, including, for example, determining a paging occasion for the first and second subscriptions based on the paging reference identifier. For example, the paging management circuitry 1242 may be configured to implement one or more of the functions described below in relation to FIG. 13, including, e.g., block 1306.

In some aspects of the disclosure, the paging management circuitry 1242 may be configured for various functions, including, for example, determining a paging frame for the first and second subscriptions based on the paging reference identifier. For example, the paging management circuitry 1242 may be configured to implement one or more of the functions described below in relation to FIG. 13, including, e.g., block 1308.

In some aspects of the disclosure, the paging management circuitry 1242 may be configured for various functions, including, for example, transmitting one or more paging messages to the first wireless device and the second wireless device during the paging occasion. For example, the paging management circuitry 1242 may be configured to implement one or more of the functions described below in relation to FIG. 13, including, e.g., block 1310.

The processor 1204 is responsible for managing the bus 1202 and general processing, including the execution of software stored on the processor-readable storage medium 1206. The software, when executed by the processor 1204, causes the processing system 1214 to perform the various functions described below for any particular apparatus. The processor-readable storage medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1206. The processor-readable storage medium 1206 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1206 may reside in the processing system 1214, external to the processing system 1214, or distributed across multiple entities including the processing system 1214. The processor-readable storage medium 1206 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 1206 may include communication management software/instructions 1250 configured for various functions, including, for example, receiving, from a core network device, a first paging request including a paging reference identifier and a first device identifier associated with a first wireless device configured to communicate using a first subscription. For example, the communication management software/instructions 1250 may be configured to implement one or more of the functions described below in relation to FIG. 13, including, e.g., block 1302.

In some aspects of the disclosure, the communication management software/instructions 1250 may be configured for various functions, including, for example, receiving, from the core network device, a second paging request including the paging reference identifier and a second device identifier associated with a second wireless device configured to communicate using a second subscription, wherein the paging reference identifier is associated with the first and second subscriptions. For example, the communication management software/instructions 1250 may be configured to implement one or more of the functions described below in relation to FIG. 13, including, e.g., block 1304.

In some aspects of the disclosure, the processor-readable storage medium 1206 may include paging management software/instructions 1252 configured for various functions, including, for example, determining a paging occasion for the first and second subscriptions based on the paging reference identifier. For example, the paging management software/instructions 1252 may be configured to implement one or more of the functions described below in relation to FIG. 13, including, e.g., block 1306.

In some aspects of the disclosure, the processor-readable storage medium 1206 may include paging management software/instructions 1252 configured for various functions, including, for example, determining a paging frame for the first and second subscriptions based on the paging reference identifier. For example, the paging management software/instructions 1252 may be configured to implement one or more of the functions described below in relation to FIG. 13, including. e.g., block 1308.

In some aspects of the disclosure, the processor-readable storage medium 1206 may include paging management software/instructions 1252 configured for various functions, including, for example, transmitting one or more paging messages to the first wireless device and the second wireless device during the paging occasion. For example, the paging management software/instructions 1252 may be configured to implement one or more of the functions described below in relation to FIG. 13, including, e.g., block 1310.

Figure 13:
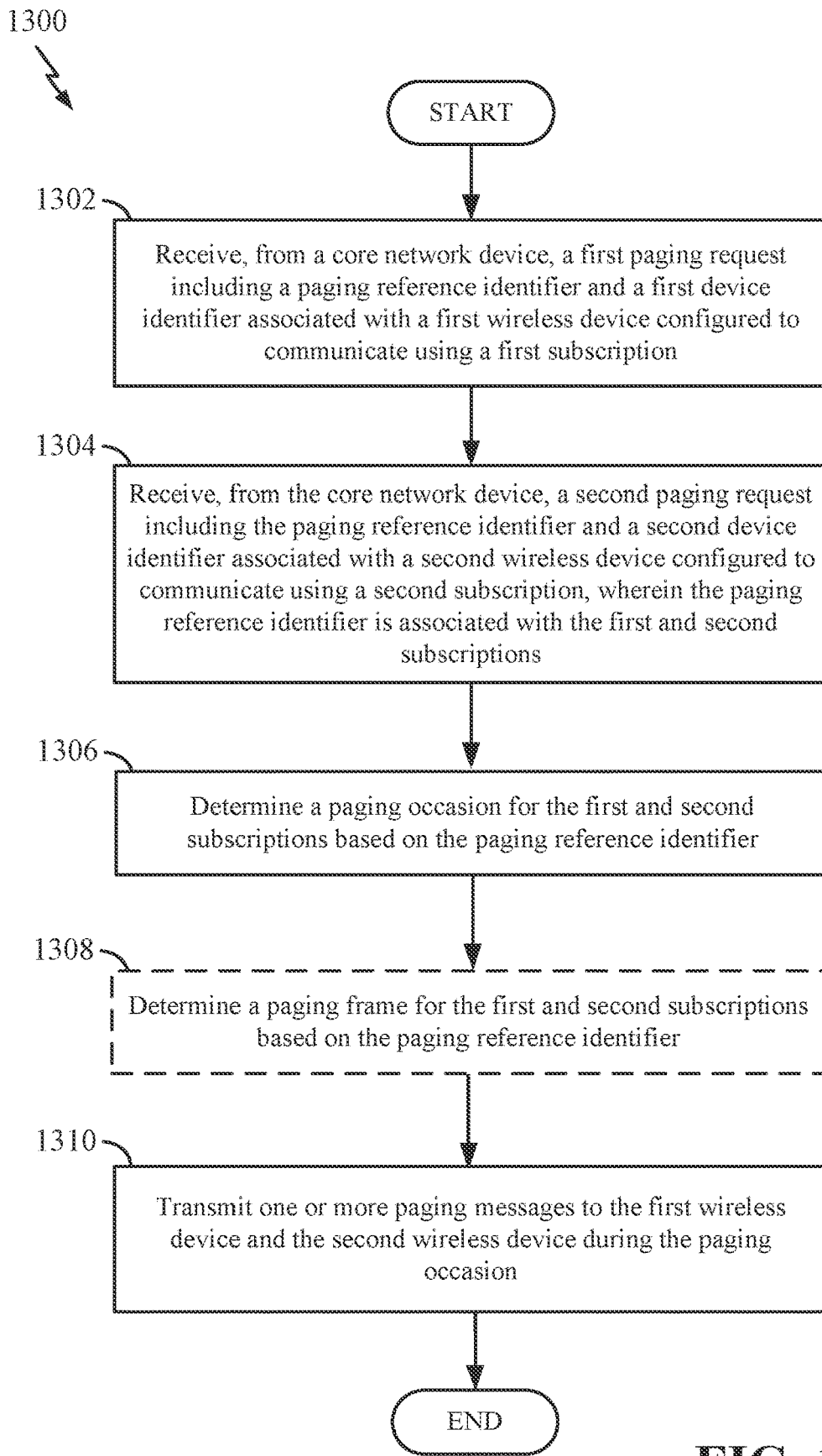
FIG. 13 is a flow chart illustrating an exemplary process for wireless communication by a base station, according to some aspects of the disclosure.

FIG. 13 is a flow chart illustrating an exemplary process 1300 for wireless communication by a base station, in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the base station 1200 illustrated in FIG. 12. In some examples, the process 1300 may be carried out by any suitable apparatus or means for carrying out the functions or algorithm described below.

At block 1302, the process 1300 includes receiving, from a core network device, a first paging request including a paging reference identifier and a first device identifier associated with a first wireless device configured to communicate using a first subscription.

At block 1304, the process 1300 includes receiving, from the core network device, a second paging request including the paging reference identifier and a second device identifier associated with a second wireless device configured to communicate using a second subscription, wherein the paging reference identifier is associated with the first and second subscriptions.

At block 1306, the process 1300 includes determining a paging occasion for the first and second subscriptions based on the paging reference identifier.

At block 1308, in an aspect, the process 1300 may include determining a paging frame for the first and second subscriptions based on the paging reference identifier.

At block 1310, the process 1300 includes transmitting one or more paging messages to the first wireless device and the second wireless device during the paging occasion. In an aspect, the one or more paging messages include the first and second device identifiers. In an aspect, the one or more paging messages may be transmitted to the UE in response to the first paging request and the second paging request. In an aspect, the one or more paging messages may be transmitted in the paging frame.

In an aspect, the first paging request may be received from a first AMF of the core network device, and the second paging request may be received from a second AMF of the core network device. In an aspect, the first device identifier may be a first TMSI and the second device identifier may be a second TMSI. In an aspect, the first wireless device and the second wireless device may be a first SIM and a second SIM implemented within a UE, respectively. In an aspect, the first wireless device and the second wireless device may be separately operable.

In one configuration, the base station 1200 for wireless communication includes means for receiving, from a core network device, a first paging request including a paging reference identifier and a first device identifier associated with a first wireless device configured to communicate using a first subscription, means for receiving, from the core network device, a second paging request including the paging reference identifier and a second device identifier associated with a second wireless device configured to communicate using a second subscription, wherein the paging reference identifier is associated with the first and second subscriptions, means for determining a paging occasion for the first and second subscriptions based on the paging reference identifier, means for transmitting one or more paging messages to the first wireless device and the second wireless device during the paging occasion, and may further include means for determining a paging frame for the first and second subscriptions based on the paging reference identifier. In one aspect, the aforementioned means may be the processor(s) 1204 shown in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the processor-readable storage medium 1206, or any other suitable apparatus or means described in any one of the FIGS. 1, 2, 3, 4, 5, 6, and/or 7, and utilizing, for example, the processes and/or algorithms described herein in relation to FIG. 13.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20. Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a core network device, comprising:
   performing a first network registration with a first wireless device using a first subscription, wherein performing the first network registration includes associating a paging reference identifier with the first subscription;
   performing a second network registration with a second wireless device using a second subscription, wherein performing the second network registration includes associating the paging reference identifier further with the second subscription to cause the paging reference identifier to be associated with the first subscription and the second subscription; and
   requesting a base station to page the first wireless device and the second wireless device during a common paging occasion for the first subscription and the second subscription, the common paging occasion being based on the paging reference identifier associated with the first subscription and the second subscription.

2. The method of claim 1, wherein performing the first network registration comprises:
   receiving a first registration request for the first network registration from the first wireless device using the first subscription, the first registration request including a paging reference identifier request;
   allocating the paging reference identifier to associate the paging reference identifier with the first subscription in response to the paging reference identifier request; and
   transmitting a first registration response including the paging reference identifier to the first wireless device in response to the first registration request.

3. The method of claim 2, wherein the first registration request is received at a first access and mobility management function (AMF) of the core network device, and the first registration response is transmitted from the first AMF.

4. The method of claim 1, wherein performing the first network registration comprises:
   receiving a first registration request for the first network registration from the first wireless device using the first subscription, the first registration request including the paging reference identifier associated with the first subscription; and
   transmitting a first registration response including the paging reference identifier to the first wireless device in response to the first registration request.

5. The method of claim 1, wherein performing the second network registration comprises:
   receiving a second registration request for the second network registration from the second wireless device using the second subscription, the second registration request including the paging reference identifier;
   associating the paging reference identifier further with the second subscription; and
   transmitting a second registration response to the second wireless device in response to the second registration request.

6. The method of claim 5, wherein the second registration request is received at a second access and mobility management function (AMF) of the core network device, and the second registration response is transmitted from the second AMF.

7. The method of claim 1, wherein requesting the base station to page the first and second wireless devices comprises:

requesting the base station to transmit one or more paging messages to the first wireless device and the second wireless device during a paging occasion based on the paging reference identifier, the one or more paging messages including a first device identifier associated with the first wireless device and a second device identifier associated with the second wireless device.

8. The method of claim 7, wherein requesting the base station to transmit the one or more paging messages comprises:

transmitting, to the base station, a first paging request including the paging reference identifier and the first device identifier associated with the first wireless device; and transmitting, to the base station, a second paging request including the paging reference identifier and the second device identifier associated with the second wireless device, wherein the first paging request and the second paging request cause the base station to transmit the one or more paging messages to the first wireless device and the second wireless device.

9. The method of claim 7, wherein the first device identifier is a first temporary mobile subscriber identity (TMSI) and the second device identifier is a second TMSI.

10. The method of claim 1, further comprising:

updating the paging reference identifier to associate the updated paging reference identifier with the first subscription and the second subscription.

11. The method of claim 10, wherein updating the paging reference identifier comprises:

allocating the updated paging reference identifier to associate the updated paging reference identifier with the first subscription;

transmitting the updated paging reference identifier to the first wireless device;

receiving a registration update request from the second wireless device, the registration update request including the updated paging reference identifier; and associating the updated paging reference identifier further with the second subscription.

12. The method of claim 11, wherein the updated paging reference identifier is transmitted to the first wireless device via at least one of a network registration procedure or a device configuration update procedure.

13. The method of claim 10, wherein updating the paging reference identifier comprises:

receiving a first registration update request from the first wireless device, the first registration update including the updated paging reference identifier associated with the first subscription;

receiving a second registration update request from the second wireless device, the second registration update including the updated paging reference identifier; and associating the updated paging reference identifier further with the second subscription.

14. The method of claim 1, wherein the paging reference identifier is allocated independent of a first global unique temporary identifier (GUTI) associated with the first wireless device.

15. The method of claim 1, wherein the first wireless device and the second wireless device are a first subscriber identity module (SIM) and a second SIM implemented within a user equipment (UE), respectively.

16. A core network device for wireless communication, comprising:

at least one processor;

a transceiver communicatively coupled to the at least one processor; and a memory communicatively coupled to the at least one processor, wherein the at least one processor is configured to:

perform a first network registration with a first wireless device using a first subscription, wherein performing the first network registration includes associating a paging reference identifier with the first subscription;

perform a second network registration with a second wireless device using a second subscription, wherein performing the second network registration includes associating the paging reference identifier further with the second subscription to cause the paging reference identifier to be associated with the first subscription and the second subscription; and request a base station to page the first wireless device and the second wireless device during a common paging occasion for the first subscription and the second subscription, the common paging occasion being based on the paging reference identifier associated with the first subscription and the second subscription.

17. The core network device of claim 16, wherein the at least one processor configured to perform the first network registration is configured to:

receive a first registration request for the first network registration from the first wireless device using the first subscription, the first registration request including a paging reference identifier request;

allocate the paging reference identifier to associate the paging reference identifier with the first subscription in response to the paging reference identifier request; and transmit a first registration response including the paging reference identifier to the first wireless device in response to the first registration request.

18. The core network device of claim 16, wherein the at least one processor configured to perform the first network registration is configured to:

receive a first registration request for the first network registration from the first wireless device using the first subscription, the first registration request including the paging reference identifier associated with the first subscription; and transmit a first registration response including the paging reference identifier to the first wireless device in response to the first registration request.

19. The core network device of claim 16, wherein the at least one processor configured to perform the second network registration is configured to:

receive a second registration request for the second network registration from the second wireless device using the second subscription, the second registration request including the paging reference identifier;

associate the paging reference identifier further with the second subscription; and transmit a second registration response to the second wireless device in response to the second registration request.

20. A method of wireless communication by a user equipment (UE) configured to communicate using multiple subscriptions, comprising:

performing a first network registration with a core network device using a first subscription of the UE, wherein performing the first network registration includes associating a paging reference identifier with the first subscription;

performing a second network registration with the core network device using a second subscription of the UE, wherein performing the second network registration includes associating the paging reference identifier further with the second subscription to cause the paging reference identifier to be associated with the first subscription and the second subscription; and receiving, from a base station, one or more paging messages associated with the first subscription and the second subscription during a common paging occasion for the first subscription and the second subscription, the common paging occasion being based on the paging reference identifier associated with the first subscription and the second subscription.

21. The method of claim 20, wherein performing the first network registration comprises:

transmitting, to the core network device, a first registration request for the first network registration using the first subscription, the first registration request including a paging reference identifier request; and receiving, from the core network device, a first registration response including the paging reference identifier associated with the first subscription in response to the first registration request.

22. The method of claim 20, wherein performing the first network registration comprises:

allocating the paging reference identifier to associate the paging reference identifier with the first subscription;

transmitting, to the core network device, a first registration request for the first network registration using the first subscription, the first registration request including the paging reference identifier associated with the first subscription; and receiving, from the core network device, a first registration response in response to the first registration request.

23. The method of claim 20, wherein performing the second network registration comprises:

transmitting, to the core network device, a second registration request for the second network registration using the second subscription, the second registration request including the paging reference identifier; and receiving, from the core network device, a second registration response in response to the second registration request.

24. The method of claim 20, wherein the one or more paging messages include a first device identifier associated with the first subscription and a second device identifier associated with the second subscription.

25. The method of claim 20, wherein receiving the one or more paging messages comprises:

determining the common paging occasion based on the paging reference identifier; and monitoring for the one or more paging messages during the common paging occasion to receive the one or more paging messages during the common paging occasion.

26. The method of claim 20, further comprising:

updating the paging reference identifier to associate the updated paging reference identifier with the first subscription and the second subscription.

27. The method of claim 26, wherein updating the paging reference identifier comprises:

receiving, from the core network device, the updated paging reference identifier associated with the first subscription using the first subscription; and transmitting, to the core network device, a registration update request using the second subscription, the registration update request including the updated paging reference identifier to associate the updated paging reference identifier further with the second subscription.

28. The method of claim 27, wherein the updated paging reference identifier is received via at least one of a network registration procedure or a device configuration update procedure.

29. The method of claim 26, wherein updating the paging reference identifier comprises:

allocating the updated paging reference identifier to associate the updated paging reference identifier with the first subscription;

transmitting, to the core network device, a first registration update request using the first subscription, the first registration update including the updated paging reference identifier associated with the first subscription; and transmitting, to the core network device, a second registration update request using the second subscription, the second registration update including the updated paging reference identifier to associate the updated paging reference identifier further with the second subscription.

30. A user equipment (UE) for wireless communication, comprising:

at least one processor;

a transceiver communicatively coupled to the at least one processor; and a memory communicatively coupled to the at least one processor, wherein the at least one processor is configured to:

perform a first network registration with a core network device using a first subscription of the UE, wherein performing the first network registration includes associating a paging reference identifier with the first subscription;

perform a second network registration with the core network device using a second subscription of the UE, wherein performing the second network registration includes associating the paging reference identifier further with the second subscription to cause the paging reference identifier to be associated with the first subscription and the second subscription; and receive, from a base station, one or more paging messages associated with the first subscription and the second subscription during a common paging occasion for the first subscription and the second subscription, the common paging occasion being based on the paging reference identifier associated with the first subscription and the second subscription.

31. A method of wireless communication by a base station, comprising:

receiving, from a core network device, a first paging request including a paging reference identifier and a first device identifier associated with a first wireless device configured to communicate using a first subscription;

receiving, from the core network device, a second paging request including the paging reference identifier and a second device identifier associated with a second wireless device configured to communicate using a second subscription, wherein the paging reference identifier is associated with the first and second subscriptions;

determining a common paging occasion for the first and second subscriptions based on the paging reference identifier associated with the first and second subscriptions; and transmitting one or more paging messages to the first wireless device and the second wireless device during the common paging occasion.

32. The method of claim 31, wherein the one or more paging messages include the first and second device identifiers.

33. The method of claim 31, further comprising:
determining a paging frame for the first and second subscriptions based on the paging reference identifier, wherein the one or more paging messages are transmitted in the paging frame.

34. The method of claim 31, wherein the one or more paging messages are transmitted to the UE-first wireless device and the second wireless device in response to the first paging request and the second paging request, respectively.

35. The method of claim 31, wherein the first paging request is received from a first access and mobility management function (AMF) of the core network device, and the second paging request is received from a second AMF of the core network device.

* * * * *